US008385397B2

(12) United States Patent
Fimoff et al.

(10) Patent No.: US 8,385,397 B2
(45) Date of Patent: Feb. 26, 2013

(54) METHOD FOR DETERMINING THE STEP SIZE FOR AN LMS ADAPTIVE EQUALIZER FOR 8VSB

(75) Inventors: Mark Fimoff, Hoffman Estates, IL (US); Jin Kim, Lake Zurich, IL (US); Gregory J. Tomezak, Buffalo Grove, IL (US)

(73) Assignee: Techwell LLC, Milpitas, CA (US)

( * ) Notice: Subject to any disclaimer, the term of this patent is extended or adjusted under 35 U.S.C. 154(b) by 1158 days.

(21) Appl. No.: 11/687,909

(22) Filed: Mar. 19, 2007

(65) Prior Publication Data

US 2008/0175308 A1 Jul. 24, 2008

Related U.S. Application Data

(60) Provisional application No. 60/885,692, filed on Jan. 19, 2007.

(51) Int. Cl.
*H03H 7/30* (2006.01)
*H03H 7/40* (2006.01)
*H03K 5/159* (2006.01)

(52) U.S. Cl. ........................................................ 375/232

(58) Field of Classification Search .................... 375/232
See application file for complete search history.

(56) References Cited

U.S. PATENT DOCUMENTS

| | | | |
|---|---|---|---|
| 4,027,258 A | 5/1977 | Perreault | |
| 5,530,485 A | 6/1996 | Kim et al. | |
| 5,886,748 A | 3/1999 | Lee | |
| 5,940,435 A | 8/1999 | Hendrickson | |
| 6,144,697 A | 11/2000 | Gelfand et al. | |
| 6,332,000 B1 * | 12/2001 | Lee | 375/232 |
| 6,515,713 B1 | 2/2003 | Nam | |
| 6,526,093 B1 | 2/2003 | Bao et al. | |
| 6,577,685 B1 | 6/2003 | Bao et al. | |
| 6,621,863 B1 | 9/2003 | Ido | |
| 6,647,071 B2 | 11/2003 | Sommer et al. | |
| 6,775,335 B2 | 8/2004 | Sommer et al. | |
| 6,907,064 B1 | 6/2005 | Tokunaga et al. | |
| 6,912,258 B2 | 6/2005 | Birru | |
| 7,038,731 B2 | 5/2006 | Tsuie | |
| 7,061,977 B2 | 6/2006 | Martin et al. | |
| 7,110,449 B2 | 9/2006 | Heo et al. | |
| 7,123,653 B2 | 10/2006 | Kim et al. | |
| 7,158,568 B2 | 1/2007 | Park et al. | |
| 7,773,700 B2 * | 8/2010 | Kang et al. | 375/341 |
| 2003/0215029 A1 | 11/2003 | Limberg | |
| 2004/0190649 A1 | 9/2004 | Endres et al. | |
| 2005/0129143 A1 | 6/2005 | Kang et al. | |
| 2005/0175081 A1 | 8/2005 | Zhidkov | |
| 2005/0243908 A1 | 11/2005 | Heo et al. | |
| 2005/0259767 A1 | 11/2005 | Garmany et al. | |
| 2005/0286622 A1 * | 12/2005 | Kim et al. | 375/232 |

(Continued)

OTHER PUBLICATIONS

Office Action from U.S. Patent Office for U.S. Appl. No. 11/776,233, dated Sep. 3, 2008 (18 pages).

(Continued)

*Primary Examiner* — David C. Payne
*Assistant Examiner* — Tanmay Shah
(74) *Attorney, Agent, or Firm* — Fogg & Powers LLC

(57) ABSTRACT

A method and system for determining a step size of an adaptive equalizer for a digital data receiver. The data received by the receiver includes coded symbols and uncoded symbols. The method includes determining a first error estimate based on decoded symbols corresponding to the coded symbols, determining a second error estimate based on the uncoded symbols, adaptively selecting the first error estimate or the second error estimate based on a convergence criterion, and determining a step size based on the selected error estimate.

30 Claims, 15 Drawing Sheets

U.S. PATENT DOCUMENTS

| | | |
|---|---|---|
| 2006/0039460 A1 | 2/2006 | Fimoff |
| 2006/0200511 A1 | 9/2006 | Park et al. |
| 2006/0239342 A1* | 10/2006 | Amizic et al. ............ 375/233 |
| 2007/0019825 A1 | 1/2007 | Marumoto et al. |
| 2007/0104263 A1* | 5/2007 | Chang et al. ............ 375/232 |
| 2007/0104264 A1* | 5/2007 | Park et al. ............ 375/233 |
| 2008/0260014 A1* | 10/2008 | Yang et al. ............ 375/232 |

OTHER PUBLICATIONS

Advanced Television Systems Committee, ATSC Digital Television Standard (A-53) Revision E, with Amendments No. 1 and 2, dated Dec. 27, 2005, Apr. 18, 2006 and Sep. 13, 2006, 38 pages.

Advanced Television Systems Committee, Recommended Practice: Guide to the Use of the ATSC Digital Television Standard, Doc. A/54A, dated Dec. 4, 2003, 2 pages.

Advanced Television Systems Committee, (Working Draft) Informational Document: DTV Signal Reception and Processing Considerations, Doc. T3-600r2, dated Jul. 21, 2003, 6 pages.

William Jay Hillery, Ph.D., Thesis, Purdue University, 2004, Advanced Equalization of Digital Television Signals Using the Conjugate Gradient Algorithm, Section 2, dated May 2004, 12 pages.

Serdar Ozen, Ph.D., Thesis, Purdue University, 2003, Topics on Channel Estimation and Equalization for Sparse Channels with Applications to Digital TV Systems, dated May 2003, 10 pages.

S. Haykin, Adaptive Filter Theory, Sections 5.4, 8.2, 9.2, Prentice Hall, 1996, 9 pages.

J. G. Proakis, Digital Communications, 3rd ed., McGraw-Hill, 1995, section 8-2-2, 3 pages.

R. H. Kwong, E. E. Johnston, A Variable Step Size LMS Algorithm, IEEE Transactions on Signal Processing, vol. 40, No. 7, Jul. 1992, 10 pages.

Richard W. Harris, Douglas M. Chabries, F. Avery Bishop, A Variable Step (VS) Adaptive Filter Algorithm, IEEE Transactions on Acoustics, Speech, and Signal Processing, vol. ASSP-34, No. 2, April, 1986, 8 pages.

B. Farhang-Boroujeny, Adaptive Filters Theory and Applications, Section 6.7 and Chapter 8, Wiley, 1998, 26 pages.

V. John Mathews, Zhenhua Xie, A Stochastic Gradient Adaptive Filter with Gradient Adaptive Step Size, IEEE Transactions on Signal Processing, vol. 41, No. 6, Jun. 1993, 13 pages.

Advanced Television Systems Committee, ATSC Recommended Practice: Receiver Performance Guidelines, Doc. A/74, dated Jul. 18, 2004, 10 pages.

Jae Chon Lee, Chong Dwan Un, A Reduced Structure of the Frequency-Domain Block LMS Adaptive Digital Filter, Proceeding of the IEEE, Vol. 72, No. 12, Dec. 1984, 3 pages.

Jae Chon Lee, Chong Kwan Un, Performance Analysis of Frequency-Domain Block LMS Adaptive Digital Filters, IEEE Transactions on Circuits and Systems, Vol. 36, No. 2, Feb. 1989, 17 pages.

David Sparano, What Exactly is 8-VSBB Anyway?, http://www.broadcast.net/~sbel/8vsb/8vsb.htm, dated Jan. 25, 2007, 12 pages.

* cited by examiner

METHOD FOR DETERMINING THE STEP SIZE FOR AN LMS ADAPTIVE EQUALIZER FOR 8VSB

RELATED APPLICATION

This application claims priority to U.S. Provisional Patent Application Ser. No. 60/885,692, filed on Jan. 19, 2007, the entire contents of which are incorporated herein by reference.

FIELD

Embodiments of the invention relate generally to digital communication systems and methods, and particularly to digital television receivers.

BACKGROUND

In 1996, the Advanced Television Systems Committee, Inc. ("ATSC") adopted an ATSC digital television ("DTV") terrestrial transmission standard. Several generations of receivers have been developed since adoption of the ATSC DTV standard. Generally, each generation of receivers was developed to improve reception performance over previous generations of receivers. A main impediment to good reception is severe multipath interference. Hence, complicated equalizers were developed for receivers in order to improve receiver performance by mitigating the effects of the multipath interference.

Terrestrial broadcast DTV channel presents quite a difficult multipath environment. Relatively strong duplicates of the transmitted signal may arrive at a receiver via various reflected signal paths as well as via the direct path from transmitter to receiver. In some cases, there is no direct path from transmitter to receiver, and all received signal paths are via reflection. If the path carrying the strongest signal is regarded as the main signal path, reflected signals may arrive at the receiver both prior to or subsequent to the main signal. The arrival time differences among various signal paths, compared to that of the main signal path, can be large. Also, these reflected signals may vary in time, both in terms of amplitude and delay relative to the main signal path.

During a typical transmission, data is transmitted in frames 100 as shown in FIG. 1. Each frame 100 is composed of two fields 104, 108. Each of the fields 104, 108 includes 313 segments. Each of the segments includes 832 symbols. As such, each of the fields 104, 108 includes a total of 260,416 symbols. Each of the segments begins with a four-symbol sequence, referred to as a segment sync, which comprises four symbols [+5, −5, −5, +5]. The first segment in each field is a field sync segment.

FIG. 2 shows an exemplary field sync segment 200 of the field 104 or 108 of FIG. 1. The field sync segment 200 includes a segment sync 204, a pseudo noise sequence 208 that comprises 511 symbols (PN511), a pseudo noise sequence 212 that comprises 63 symbols (PN63), a second PN63 sequence 216, and a third PN63 sequence 220. The third PN63 sequence 220 is followed by a mode sequence 224 that comprises 24 symbols to indicate a transmitting mode of 8-level vestigial sideband ("8VSB"). In alternate fields, the three PN63 sequences 212, 216, 220 are the same. In the remaining fields, the first and third PN63 sequences 212, 220 are the same while the second PN63 sequence 216 is inverted. In either case, the first 728 symbols of the field sync segment 200 are a priori known to a receiver and may be used for equalizer training. The mode sequence 224 is followed by a reserved mode sequence 228 of 92 symbols composing various mode and reserved fields that are not a priori known to the receiver. The sequences 204, 208, 212, 216, 220, 224, and 228 symbols use a symbol set of {+5, −5}. The field sync segment 200 ends with a precode sequence 232 comprising 12 symbols that use a symbol set of {−7, −5, −3, −1, +1, +3, +5, +7}, and are duplicates of the last 12 symbols of the preceding data field. These are thus called precode symbols.

The remaining 312 segments of each field 104, 108 are referred to as data segments. An exemplary data segment 300 is shown in FIG. 3. After the segment sync symbols 204, the data segment 300 includes a data sequence 304 that comprises 828 symbols. The symbols are trellis encoded by a 12 phase trellis encoder that results in 8-level symbols from a symbol set of {−7, −5, −3, −1, +1, +3, +5, +7}.

FIG. 4 shows a digital data (e.g., 8VSB) transmitter 400. The transmitter 400 includes a randomizer 404 that randomizes data to be transmitted, a Reed-Solomon encoder 408 that encodes the randomized data from the randomizer 404, and an interleaver 412 that interleaves Reed-Solomon byte-wise encoded data. The transmitter 400 also includes a trellis encoder 416 that encodes the interleaved data. An exemplary trellis encoder 416 is a 12-phase trellis encoder. A data frame formatter 420 subsequently adds segment sync symbols and field sync symbols to the trellis coded data at appropriate times to create a data frame structure like that of FIG. 1. A pilot insertion module 424 then inserts a pilot carrier frequency signal by adding a fixed DC level to each of the symbols.

A modulator 428 then implements root raised cosine pulse shaping and modulates the signal for RF transmission as an 8VSB signal at a symbol rate of 10.76 MHz. The 8VSB signal differs from other commonly used linear modulation methods such as quadrature amplitude modulation ("QAM") in that the 8VSB symbols are real, but have a pulse shape that is complex with only the real part of the pulse having a Nyquist shape.

FIG. 5 shows a block diagram of a digital data (e.g., 8VSB) receiver 500. The receiver 500 includes a tuner 504 to receive RF signals transmitted from the transmitter 400, and a demodulator 508 to demodulate the RF signal to baseband. The receiver 500 also includes a sync and timing recovery module 512 to perform symbol clock timing and frame synchronization recovery on the demodulated signals. The receiver 500 also includes a matched filter 516 to filter the recovered signals, an equalizer 520 that equalizes the filtered signals, a phase tracker 524 that reduces the phase noise of the equalized signals, a trellis decoder 528 that decodes the noise-reduced equalized signals, a deinterleaver 532 that deinterleaves the decoded signals, a Reed-Solomon decoder 536 that decodes the deinterleaved signals, and a derandomizer 540 that derandomizes the decoded signals.

The multipath RF channel between the transmitter 400 and the receiver 500 can be viewed in its baseband equivalent form. For example, the transmitted signal has a root raised cosine spectrum with a nominal bandwidth of 5.38 MHz and an excess bandwidth of 11.5% centered at one fourth of the symbol rate (i.e., 2.69 MHz). Thus, the transmitted pulse shape or pulse q(t) is complex and given by EQN. (1):

$$q(t)=e^{j\pi F_s t/2} q_{RRC}(t) \qquad (1)$$

where $F_s$ is a symbol frequency, and $q_{RRC}(t)$ is a real square root raised cosine pulse with an excess bandwidth of 11.5% of the multipath RF channel. The pulse q(t) is referred to as a "complex root raised cosine pulse." For an 8VSB system, the transmitted pulse shape q(t) and the received and matched filter pulse shape q*(−t) are identical since q(t) is conjugatesymmetric. Thus, the raised cosine pulse p(t), referred to as the "complex raised cosine pulse," is given by EQN. (2):

$$p(t)=q(t)*q*(-t) \quad (2)$$

where * denotes convolution, and * denotes complex conjugation.

The transmitted baseband signal with a data rate of 1/T symbols/sec can be represented by EQN. (3):

$$s(t) = \sum_k I_k q(t-kT), \quad (3)$$

where $\{I_k \in A \equiv \{\alpha_1, \ldots \alpha_8\} \subset R^1\}$ is a transmitted data sequence, which is a discrete 8-ary sequence taking values of the real 8-ary alphabet A. For 8VSB, the alphabet set is $\{-7, -5, -3, -1, +1, +3, +5, +7\}$.

A physical channel between the transmitter 400 and the receiver 500 is denoted c(t) and can be described by $$c(t) = \sum_{k=-L_{ha}}^{L_{hc}} c_k \delta(t-\tau_k) \quad (4)$$

where $\{c_k(\tau)\} \subset C^1$, and $L_{ha}$ and $L_{hc}$ are the maximum number of anti-causal and causal multipath delays, respectively. Constant $\tau_k$ is a multipath delay, and variable $\delta(t)$ is a Dirac delta function. Hence, the overall channel impulse response is given by EQN. (5):

$$h(t) = p(t) * c(t) = \sum_{-L_{ha}}^{L_{hc}} c_k p(t-\tau_k) \quad (5)$$

The matched filter output y(t) in the receiver prior to equalization is given by EQN. (6):

$$y(t) = \left(\sum_k \delta(t-kT)\right) * h(t) + v(t), \quad (6)$$

where v(t) is given by EQN. (7):

$$v(t) = \eta(t) * q*(-t) \quad (7)$$

which denotes a complex or colored noise process after the pulse matched filter, with $\eta(t)$ being a zero-mean white Gaussian noise process with spectral density $\sigma_n^2$ per real and imaginary part. Sampling the matched filter output y(t) at the symbol rate produces a discrete time baseband representation of the input to the equalizer 520, as shown in EQN. (8):

$$y[n] \equiv y(t)|_{t=nT} = \sum_k I_k h[n-k] + v[n]. \quad (8)$$

As stated above, for each data field of 260,416 symbols, only 728 symbols, which reside in the field sync segment 200, are a priori known and thus available for equalizer training. Furthermore, conditions of the multipath channel are generally not known a priori. As such, the equalizer 520 in the receiver 500 is so configured to adaptively identify and combat various multipath channel conditions.

In the following discussion, n represents a sample time index, regular type represents scalar variables, bold lower case type represents vector variables, bold upper case type represents matrix variables, a * superscript indicates complex conjugation, and the $^H$ superscript indicates conjugate transposition (Hermitian).

The equalizer 520 may be implemented as, or employ equalization techniques relating to, linear equalizers ("LEs"), decision feedback equalizers ("DFEs"), and predictive decision feedback equalizers ("pDFEs"). Equalizer tap weight adaptation is often achieved via a least mean square ("LMS") algorithm or system, which is a low complexity method for adaptively approximating a minimum mean squared error ("MMSE") tap weight solution, or equivalently a solution to the Weiner Hopf equations, described below.

In the case of an LE, let u[n] be an N long equalizer input vector, y[n] be the equalizer output $w^H[n]u[n]$, where $w^H[n]$ is an N long equalizer tap weight vector of a linear transversal filter or an adaptive filter, $R_{uu}[n] = E(u[n]u^H[n])$ has a size of N×N, and
$r_{du} = E(u[n]d*[n])$ Then e[n] d[n]−y[n] where d[n] is the desired symbol.

The mean squared error ("MSE") is given by $J=E(e[n]e*[n])$. It can be shown that the MSE as a function of filter taps w, J(w), is given by (n index omitted for clarity) EQN. (9):

$$J(w) = \sigma_d^2 - w^H r_{du} - r_{du}^H w + w^H R^{uu} w \quad (9)$$

A gradient vector of J(w) is given by EQN. (10):

$$\nabla J(w) = 2\frac{\partial J(w)}{\partial w^*} = \begin{bmatrix} \frac{\partial J}{\partial w_0^R} + j\frac{\partial J}{\partial w_0^I} \\ \frac{\partial J}{\partial w_1^R} + j\frac{\partial J}{\partial w_1^I} \\ - \\ - \\ \frac{\partial J}{\partial w_{N-1}^R} + j\frac{\partial J}{\partial w_{N-1}^I} \end{bmatrix} = 2(R_{uu}w - r_{du}) \quad (10)$$

An optimal MMSE tap vector $w_{opt}$ is found by setting $\nabla J(w)=0$, yielding the Weiner Hopf tap weight solution given by EQN. (11):

$$w_{opt}[n] = R_{uu}^{-1}[n] r_{du}[n] \quad (11)$$

The MSE is generally a measure of the closeness of w to $w_{opt}$. As a function of the tap weight vector w, the MSE is then given by EQN. (12):

$$J(w) = J_{min} + (w-w_{opt})^H R_{uu}(w-w_{opt}) \quad (12)$$

where $$J_{min} = \min_w J(w) = \sigma_d^2 - r_{du}^H R_{uu}^{-1} r_{du} = J(w_{opt}) \quad (12)$$

In practice, for large N, inverting $R_{uu}$ is prohibitively complicated. So a less complicated iterative solution is desirable. A steepest descent method ("SD") provides such a solution. It is given by EQN. (13):

$$w[n+1] = w[n] - \mu\{\nabla J(w[n])\} = w[n] - \mu\{R_{uu}[n]w[n] - r_{du}[n]\} \quad (13)$$

where $\mu$ is a step size parameter. However, estimating and updating $R_{uu}$ and $r_{du}$ can also be complicated.

By using instantaneous approximations for $R_{uu}$ and $r_{du}$, EQN. (13) can be greatly simplified for practical applications. For example, as shown in EQN. (14) and EQN. (15), $$R_{uu}[n] \approx u[n]u^H[n] \quad (14)$$

and $$r_{du} \approx u[n]d^*[n], \quad (15)$$

the gradient can be given by EQN. (16):

$$\nabla J(w[n]) = 2(R_{uu}[n]w[n] - r_{du}[n]) \quad (16)$$
$$\approx -2u[n][d^*[n] - u^H[n]w[n]]$$
$$\approx -2u[n]e^*[n]$$

A practical LMS algorithm for the equalizer 520, as shown in EQN. (17), can then be determined from EQN. (13):

$$w[n+1] = w[n] - \mu\{\nabla J(w[n])\} \quad (17)$$
$$= w[n] - 2\mu u[n]e^*[n]$$

where $\mu$ is a step size parameter.

FIG. 6 shows a signal-to-noise-plus-interference-ratio ("SINR") plot 600 depicting a plurality of SINRs obtained from a plurality of symbol blocks with an LMS-based LE as discussed above. Similarly, FIG. 7 shows an MSE plot 700 depicting a plurality of MSEs obtained from the plurality of symbol blocks with the LMS-based LE as discussed above. It is well known that SINR and MSE are related as shown in EQN. (18):

$$SINR = 10\log_{10}\frac{\text{signal power}}{MSE} \quad (18)$$

As shown in FIG. 6, time (in terms of symbol blocks processed by the equalizer 520) is measured along an x-axis 604, and SINR is measured along a y-axis 608. FIG. 6 shows an SINR curve 612 for different times after symbols are equalized with the equalizer 520. FIG. 6 shows that the curve 612 converges to an SINR value of about 15 dB after about 3,000 symbol blocks have been equalized, where each block includes 512 symbols. Similarly, as shown in FIG. 7, time is measured along an x-axis 704, and MSE is measured along a y-axis 708. FIG. 7 shows an MSE curve 712 for different times after symbols are equalized with the equalizer 520. FIG. 7 shows that the MSE curve 712 converges to an MSE value of about 1 dB after about 3,000 symbol blocks have been equalized.

In general, equalizer convergence is achieved when the SINR rises above a prescribed value before approaching a SINR convergence value such that subsequent error correction modules, such as the trellis decoder 528 and the Reed-Solomon decoder 536, can nearly completely correct all data errors. For 8VSB, the prescribed value is about 15 dB, and the SINR convergence value, which will depend on channel conditions, must be larger than that prescribed value. An example is shown in FIG. 6, where values of SINR rise above 15 dB before approaching an SINR convergence value of about 16 dB.

FIG. 8 shows an LE system 800 that utilizes the LMS algorithm as discussed. The LE system 800 includes a linear transversal filter 804 with tap weights w fed by an input data vector u[n]. The filter 804 has an output y[n] that feeds a non-linear decision device 808. The decision device 808 has an output d[n] that is a set of likely symbols transmitted. The output d[n] is subtracted from the output y[n] to create an error signal e[n]. The error signal e[n] is used by an LMS algorithm 812 to update the tap weights w of the filter 804 for time n+1.

SUMMARY

The following summary sets forth certain exemplary embodiments of the invention. It does not set forth all embodiments of the invention and should in no way be construed as limiting of embodiments of the invention.

In one embodiment, the invention includes a method of determining a step size of an adaptive equalizer for a digital data receiver. The data received by the receiver includes coded symbols and uncoded symbols. The method includes determining a first error estimate based on decoded symbols corresponding to the coded symbols, determining a second error estimate based on the uncoded symbols, adaptively selecting the first error estimate or the second error estimate based on a convergence criterion, and determining a step size based on the selected error estimate.

In another embodiment, the invention includes a method of determining a step size of an adaptive equalizer for a digital data receiver. The data received by the receiver includes coded symbols and uncoded symbols. The method includes, based on a convergence criterion, selecting a first signal estimation process or a second signal estimation process, the first signal estimation process utilizing decoded symbols corresponding to the coded symbols, and the second signal estimation process utilizing the uncoded symbols. The method also includes determining a signal estimate based on the selected signal estimation process, determining an error estimate based on the received data and the signal estimate, and determining a step size based on the error estimate.

In another embodiment, the invention includes an adaptive equalizer for a digital data receiver. The data received by the receiver includes coded symbols and uncoded symbols. The equalizer includes a selection module, an error estimator, and a step size generator. The selection module is configured to select, based on a convergence criterion, decoded symbols or the uncoded symbols, the decoded symbols corresponding to the coded symbols. The error estimator is configured to compare the received data and the selected symbols, and to generate an error estimate based on the comparison. The step size generator is configured to generate a step size based on the error estimate.

In another embodiment, the invention includes a device configured to process digital television signals. The device includes a receiver that includes a demodulator, a decoder, a slicer, and an equalizer. The receiver is configured to receive radio frequency signals modulated with data including coded symbols and uncoded symbols. The demodulator is configured to demodulate the received radio frequency signals to produce the coded symbols and the uncoded symbols. The decoder is configured to decode the coded symbols to produce corresponding decoded symbols, and the slicer is configured to slice the uncoded symbols to produce corresponding sliced symbols. The equalizer includes a selection module, an error estimator, and a step size generator. The selection module is configured to select, based on a convergence criterion, the decoded symbols or the sliced symbols. The error estimator is configured to compare the data and the selected symbols, and to generate an error estimate based on the comparison. The step size generator is configured to generate a step size based on the error estimate.

Other aspects of the invention will become apparent by consideration of the detailed description and accompanying drawings.

DETAILED DESCRIPTION

Figure 1:
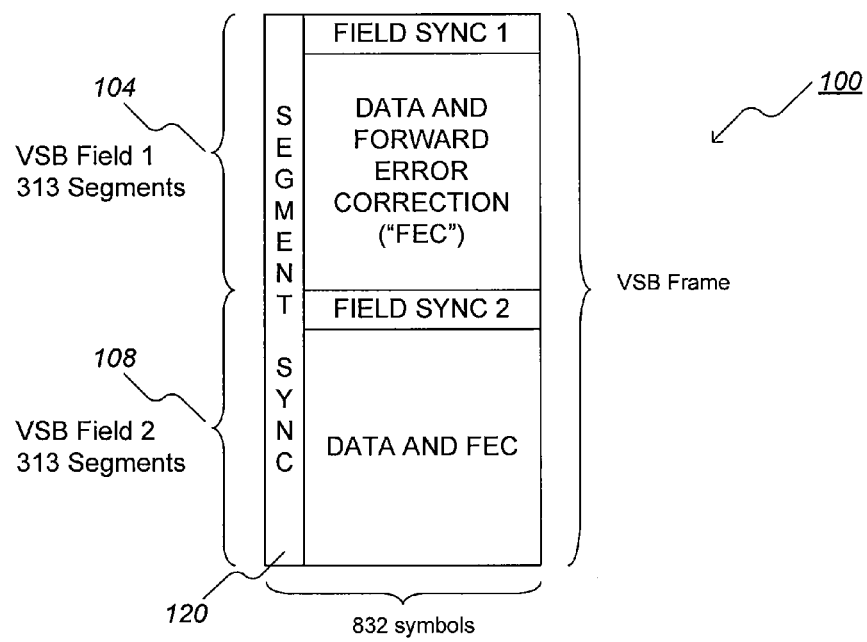
FIG. 1 shows an exemplary 8VSB data frame.
Figure 2:
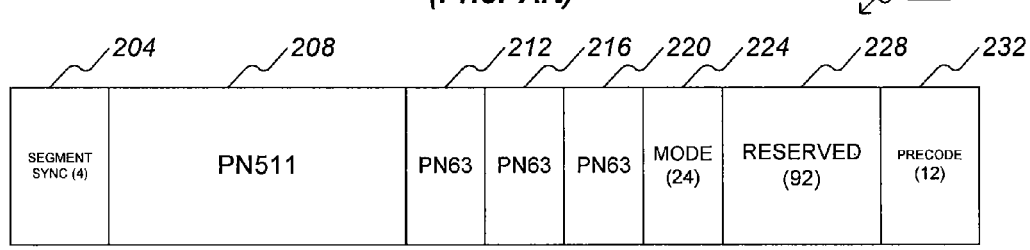
FIG. 2 shows an exemplary field sync segment.
Figure 3:
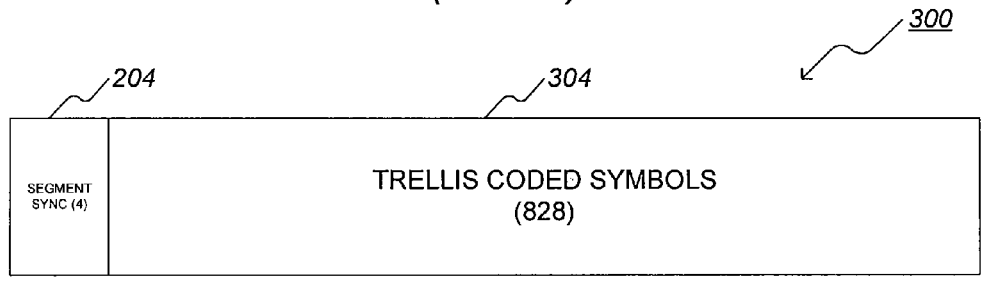
FIG. 3 shows an exemplary data segment.
Figure 4:
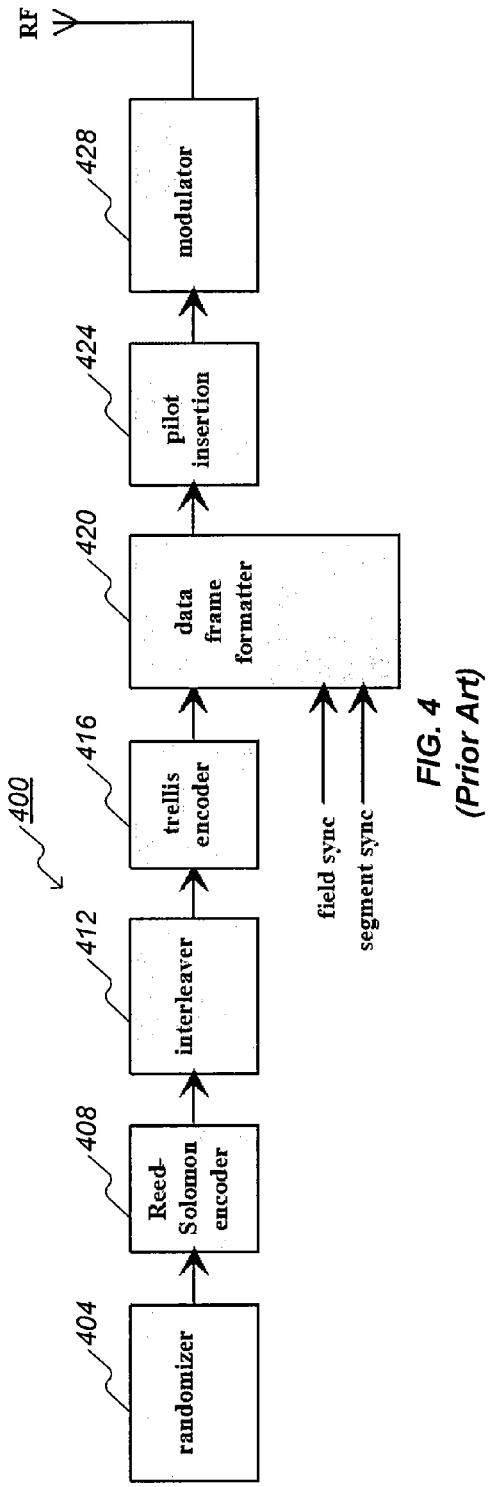
FIG. 4 shows an exemplary digital data transmitter.
Figure 5:
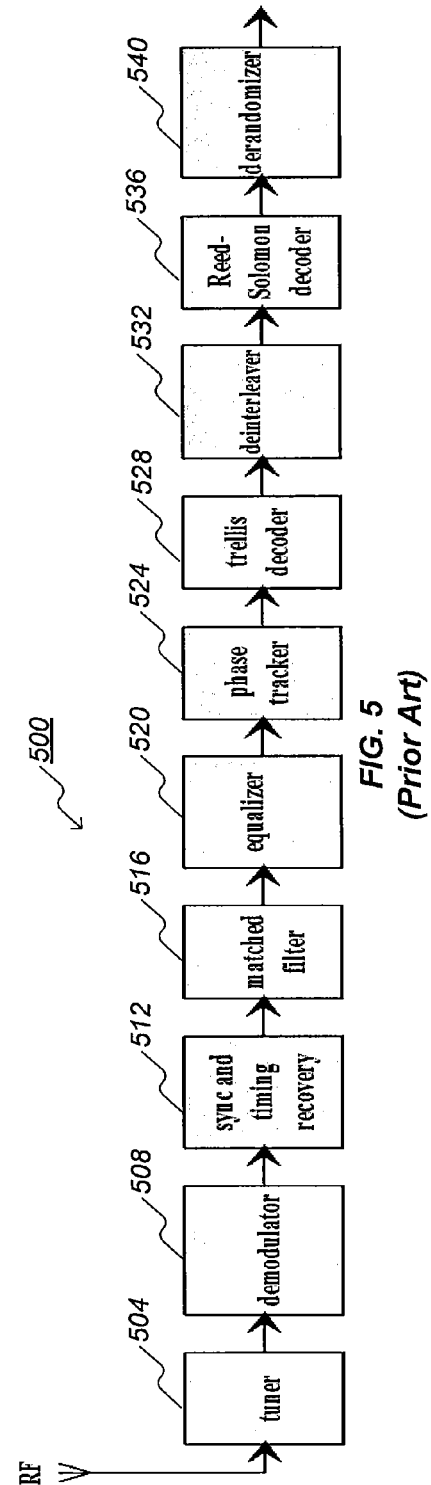
FIG. 5 shows an exemplary digital data receiver.
Figure 6:
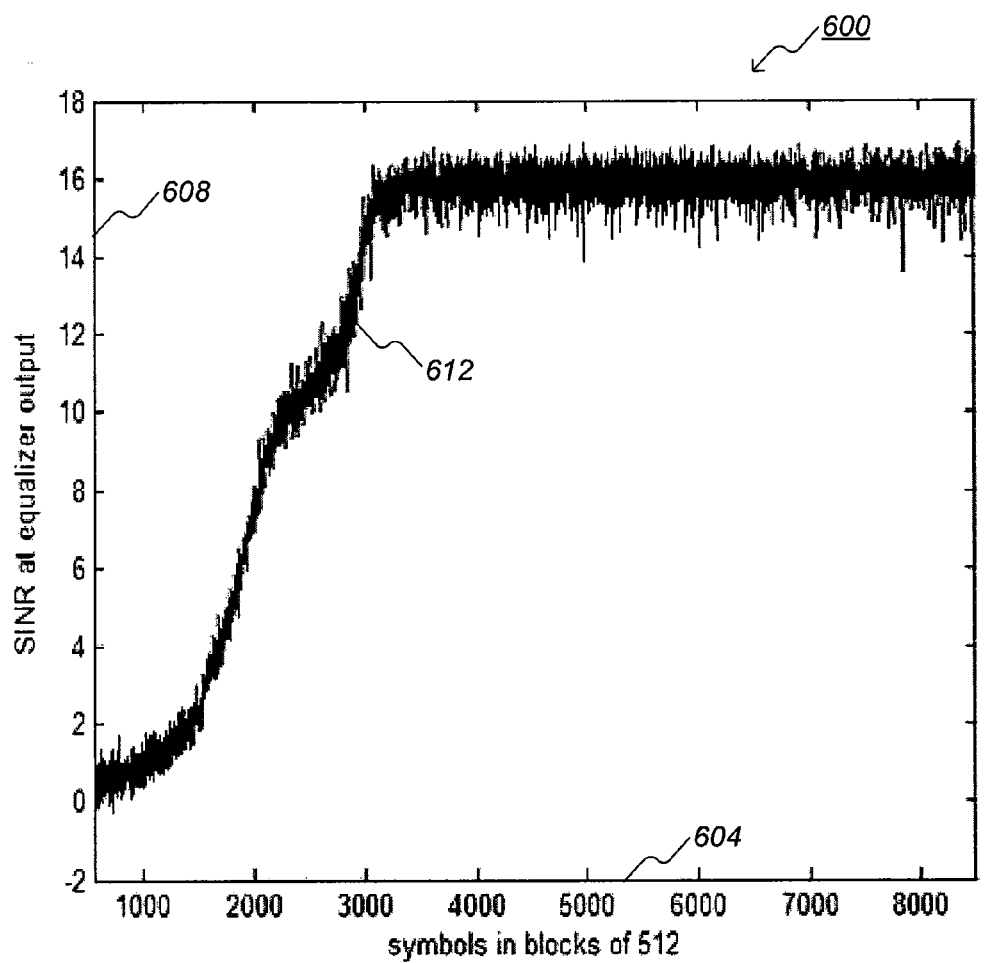
FIG. 6 shows a signal-to-noise-plus-interference-ratio ("SINR") plot depicting a plurality of SINRs obtained from a plurality of symbol blocks with the equalizer of FIG. 5.
Figure 7:
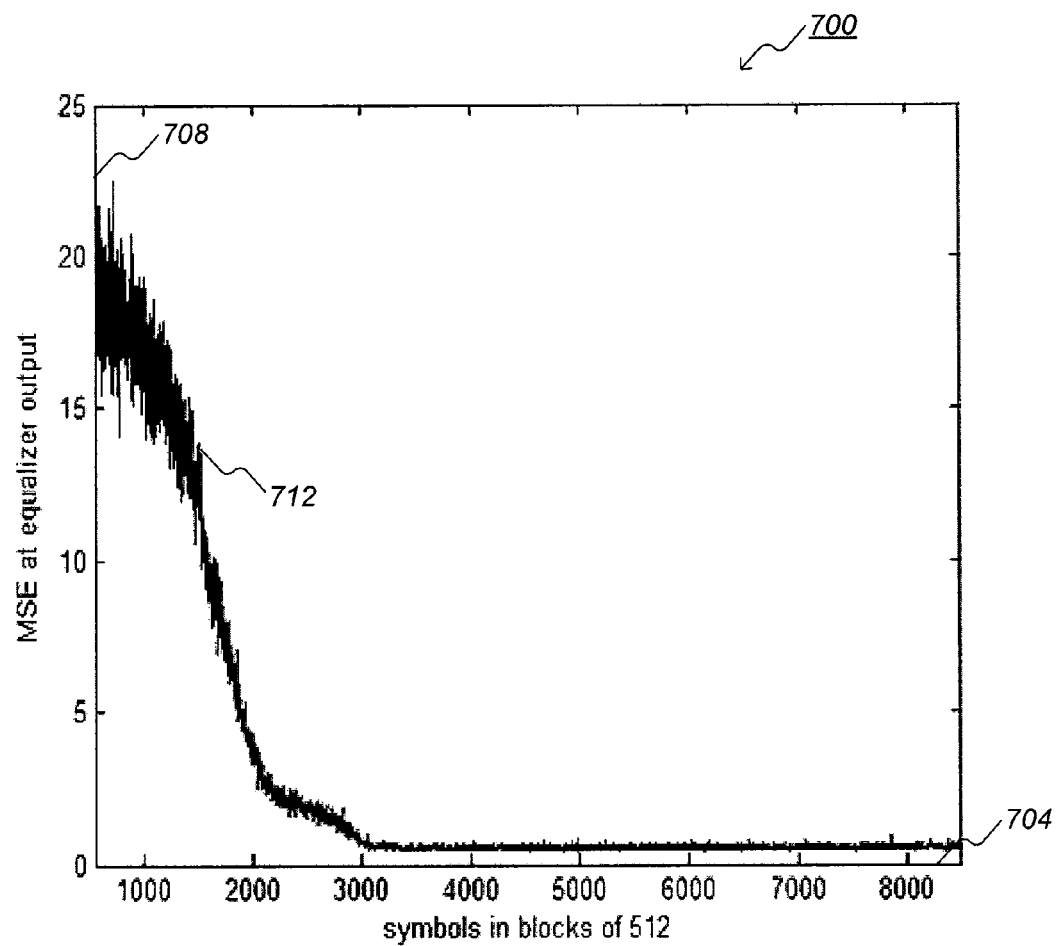
FIG. 7 shows a mean-squared-error ("MSE") plot depicting a plurality of MSEs obtained from a plurality of symbol blocks with the LMS-based linear equalizer of FIG. 5.
Figure 8:
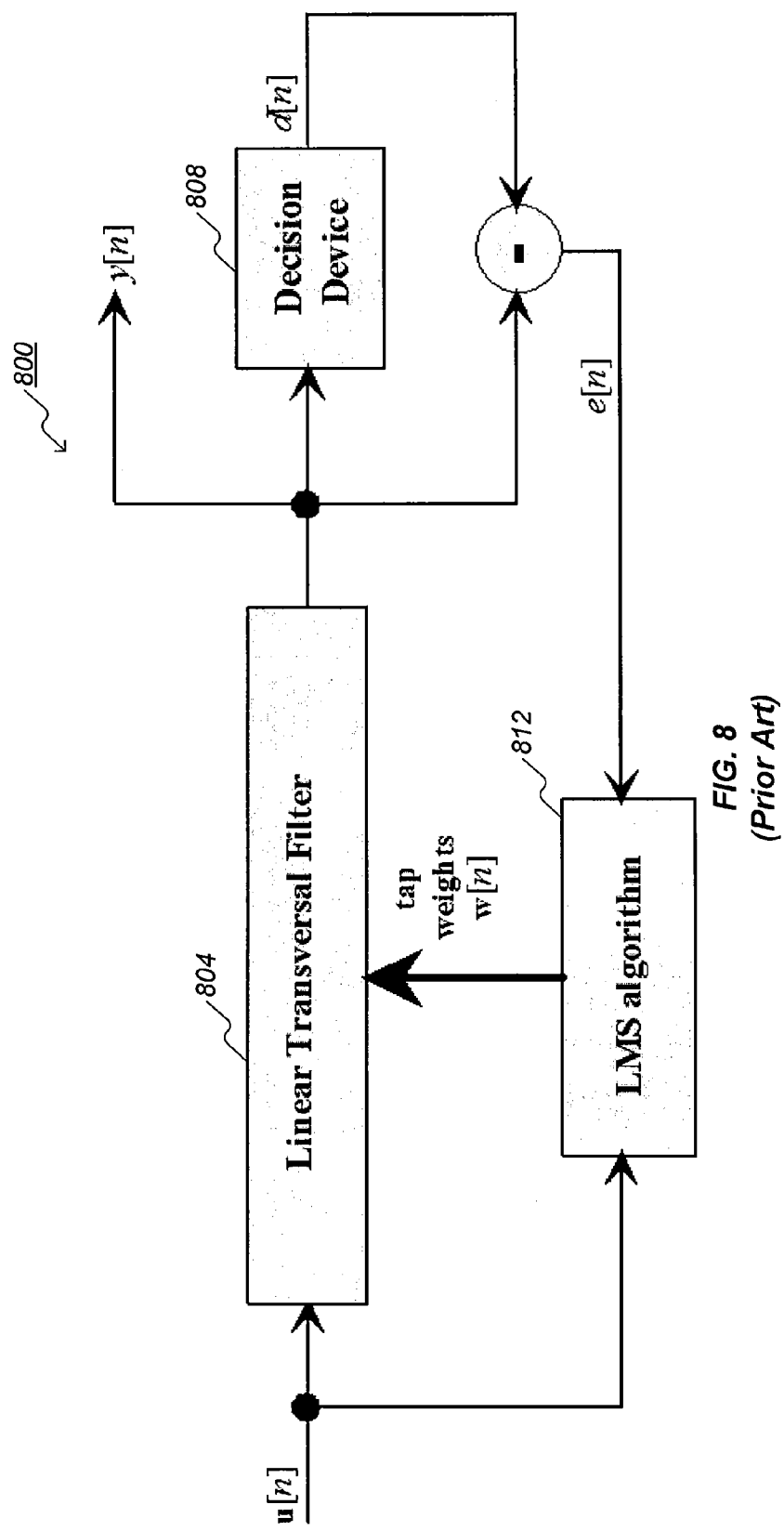
FIG. 8 shows a typical linear equalizer system having a decision device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "equalizer" or "decoder" may include or refer to both hardware and/or software. Furthermore, throughout the specification capitalized terms are used. Such terms are used to conform to common practices and to help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

As noted above, the step size $\mu$ of EQN. (17) controls a rate at which the LMS adaptive equalizer tap weights w converge to near an optimum $w_{opt}$. It is desirable to use a larger step size to decrease the amount of time needed until convergence is obtained. However, a larger step size leads to a larger steady state MSE, or lower SINR, at the output of an equalizer after convergence. Hence, after the equalizer is close to convergence, a smaller step size is desirable. Therefore, it is generally advantageous to have a variable step size whose value depends on a "closeness" of w to $w_{opt}$, thereby enabling a receiver to use a larger step size while the adaptive filter is converging and a smaller step size after convergence.

The ability of an adaptive equalizer to track a nonstationary channel is also a concern in appropriately choosing a step size $\mu$. If the equalizer converges close to the optimal tap weight vector $w_{opt}$ and is running with a small step size, but then the channel conditions change, the equalizer must adequately track and adapt the tap weight vector w. Detection of changes in channel conditions and a switch to a larger step size $\mu$, even though the equalizer has previously converged, is advantageous in this situation.

Embodiments of the invention include methods, systems, and devices for adaptively selecting a step size of an equalizer. In one specific embodiment, an adaptive equalizer selectively uses coded symbols or uncoded symbols to determine a step size by which to update tap weights used by a transversal filter. Selective use of coded symbols or uncoded symbols can enable a more accurate estimation of error throughout various states of the equalizer, which estimation in turn can be employed to determine an appropriate step size. For instance, uncoded symbols may be employed before a predetermined convergence state of the equalizer, and coded symbols may be employed once the predetermined convergence state is reached.

Embodiments herein can achieve improved performance than that achieved in existing digital communication receivers. For instance, embodiments herein can be employed to respond adaptively to changing channel conditions and more effectively select an appropriate step size. In one embodiment, iterative processes are employed to detect when current tap weights are no longer sufficiently close to optimal tap weights, and to modify the step size based on coded symbols or uncoded symbols as appropriate, so as to move closer to the optimal tap weight solution.

Although some embodiments herein focus on processing (e.g., reception) of digital television signals, the invention may be implemented in connection with other kinds of digital signals. Similarly, although some embodiments herein relate to the 8VSB RF modulation format, the invention may be implemented in connection with other modulation formats, such as formats that include coded information and a priori known information.

Additionally, although some embodiments herein relate to linear equalizers ("LEs"), the invention may be implemented in connection with other equalizer architectures, such as, for example, decision feedback equalizers ("DFEs") and predictive decision feedback equalizers ("pDFEs").

Figure 9A:
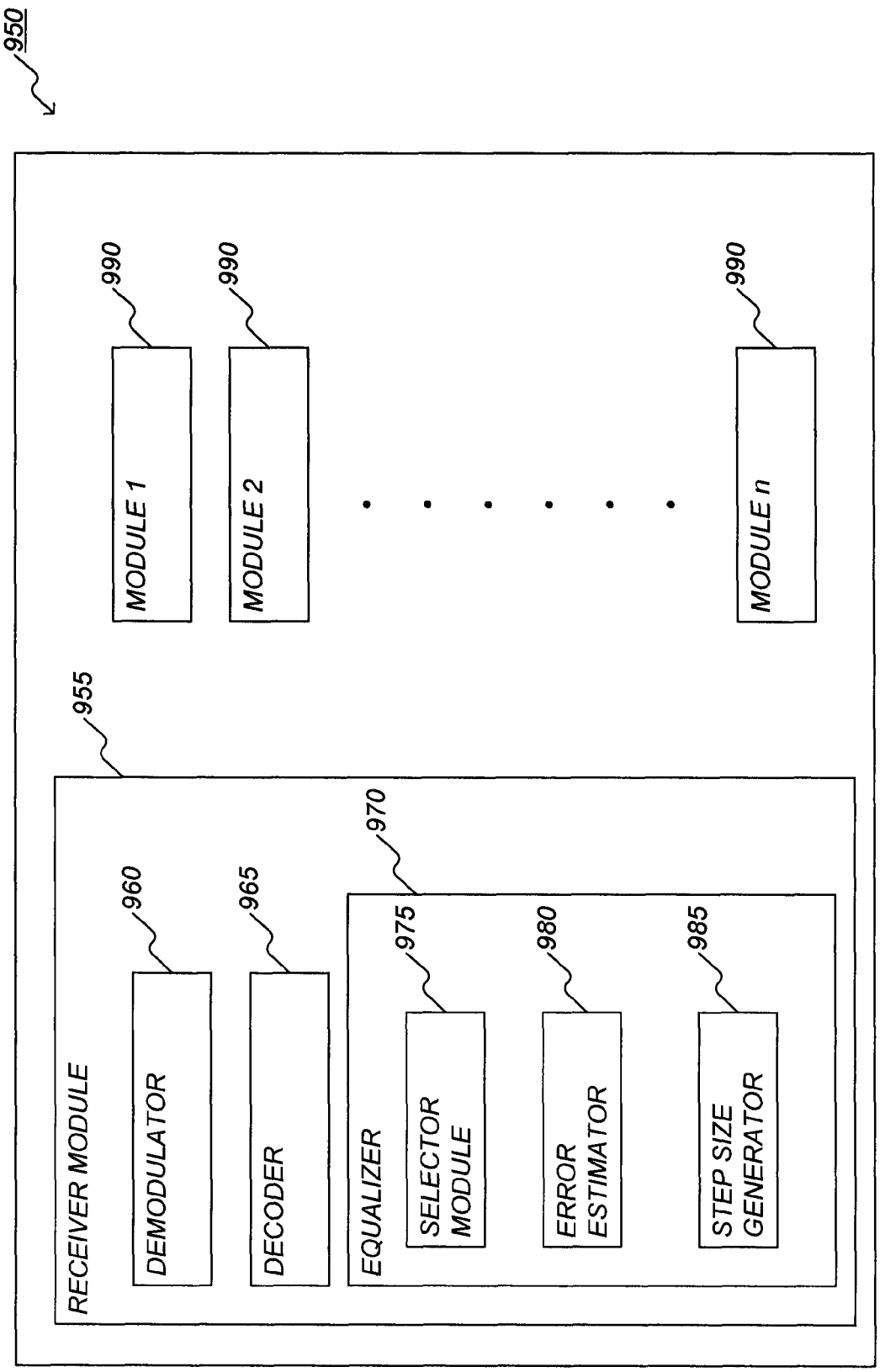
FIG. 9A shows a digital communications device according to an embodiment of the invention.

FIG. 9A shows a digital communications device 950 according to an embodiment of the invention. The device 950 can be implemented as, or in conjunction with, any of a host of devices, such as, for example, a receiver (e.g., digital communication receiver), tuner, PC adapter card, set top box, DVD recorder, HDTV recorder, television, phone, or handheld device. The device 950 can be implemented partially or entirely on a semiconductor (e.g., FPGA semiconductor) chip, such as a chip developed through a register transfer level (RTL) design process. The device 950 includes a receiver module 955 and optional hardware and/or software module (s) 990 that provide additional functions (e.g., display functions). In other embodiments, the device 950 includes more or fewer modules than those depicted. For example, certain of the depicted modules can be implemented on other devices that interface with the device 950 (e.g., the receiver module 955 can communicate with a display module incorporated in a separate device).

The receiver module 955 includes a demodulator 960, a decoder 965, and an equalizer 970. In some embodiments, the receiver module 955 includes one or more additional modules, such as, for example, a tuner, a sync and timing recovery module, a matched filter, a phase tracker, a deinterleaver, a second decoder, a slicer, and/or a derandomizer. The equalizer 970 includes a selection module 975, an error estimator 980, and a step size generator 985. Exemplary implementations of the equalizer 970 are described in further detail below.

Figure 9B:
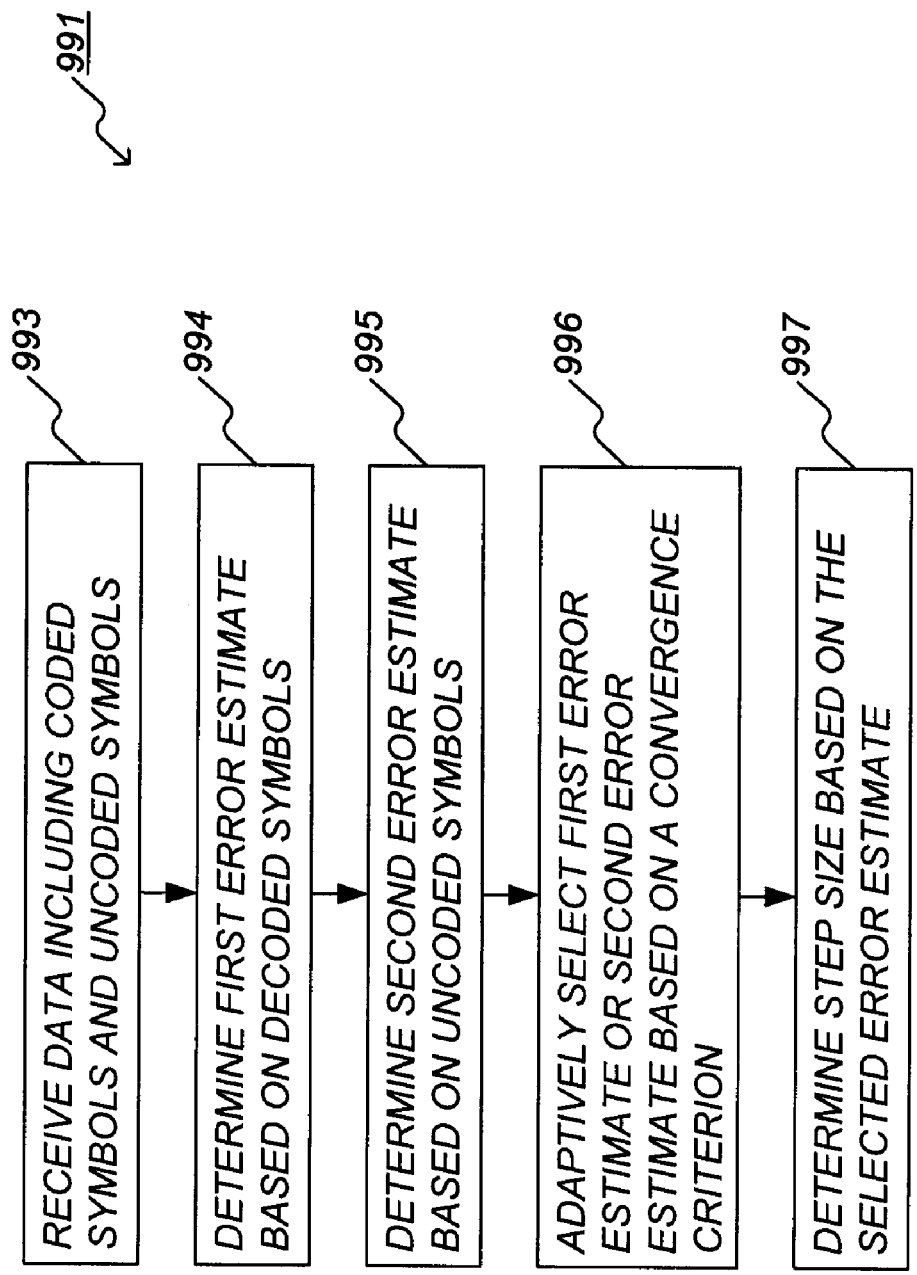
FIG. 9B shows a method according to an embodiment of the invention.

FIG. 9B shows a method 991 according to an embodiment of the invention. The method 991 can be employed by, or in conjunction with, an equalizer for a digital data receiver in order to determine a step size of the equalizer. For instance, the method 991 can be employed by the receiver module 955 and/or equalizer 970 of FIG. 9A, as well as in connection with other embodiments described below. In task 993, data is received that includes coded symbols and uncoded (e.g., a priori known) symbols. In task 994, a first error estimate is determined based on decoded symbols corresponding to the coded symbols. In task 995, a second error estimate is determined based on the uncoded symbols. In task 996, the first error estimate or the second error estimate is adaptively selected based on a convergence criterion. In task 997, a step size is determined based on the selected error estimate. The method 991 can be iteratively performed as a datastream is received and processed.

Variations of the method 991 are within the scope of embodiments of the invention. For instance, in one embodiment, a method selects either decoded symbols or uncoded symbols based on a convergence criterion; determines a signal estimate based on the selected symbols; determines an error estimate based on received data and the signal estimate; and determines a step size based on the error estimate.

Figure 9C:
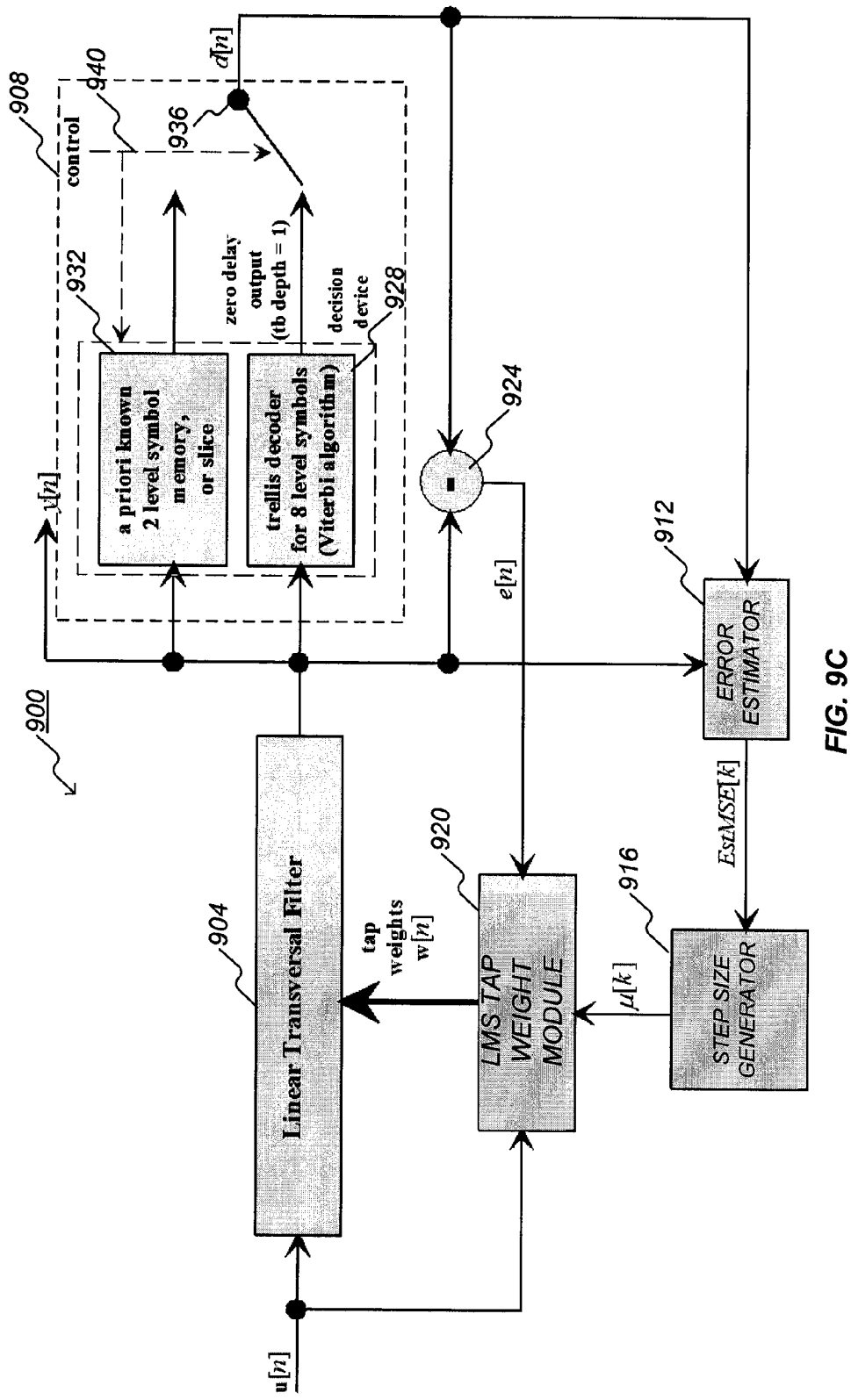
FIG. 9C shows a linear equalizer according to an embodiment of the invention.

FIG. 9C shows a linear equalizer ("LE") 900 according to an embodiment of the invention that can be implemented in a digital receiver. The equalizer 900 includes a linear transversal filter 904 having tap weights w and an output y[n], a selection module 908, an error estimator 912, a step size generator 916 that generates a step size parameter μ[k], and an LMS tap weight module 920 that adjusts the tap weights w based on the step size parameter μ[k]. In some embodiments, the error estimator 912 includes an MSE estimator. In such cases, the step size generator 916 generates the step size parameter μ[k] based on error information provided by the MSE estimator. Although FIG. 9C shows an LE, other types of equalizers, such as DFEs and pDFEs, can be employed.

As previously noted, 8VSB signals include a combination of 8-level trellis coded symbols and uncoded 2-level symbols. The selection module 908 generates an output d[n], which in turn is subtracted from y[n] to obtain e[n] at a summing node 924. The selection module 908 also feeds the output d[n] to the error estimator 912. The selection module 908 includes a trellis decoder 928 that decodes the coded symbols at the equalizer output y[n] using the Viterbi algorithm. In the embodiment shown, the decoder 928 has a zero delay or a traceback depth of one output. While longer traceback depth decisions are generally more reliable, they incur a longer delay, which can be unacceptable if an instantaneous e[n] is needed for the LMS update.

Most of the uncoded symbols including all segment sync symbols and the first 728 symbols of the field sync segment are a priori known. These are perfectly "decoded" by reading them out of a memory at appropriate times. The 92 unknown 2-level symbols at the end of the field sync segment are decoded by slicing at a midpoint with a slicer 932 since the unknown symbols are 2-level symbols.

Through a control line 940, a synchronizing control signal indicates to the selection module 908 and a switch 936 which type of symbol is being decoded. Exemplary methods for deriving this control signal first require symbol clock recovery, then data field synchronization, both of which occur in the preceding sync and timing recovery block, and then a modulo 260,416 symbol clock rate counter feeding a comparator that activates the control line 940 according to the type of symbol.

The error estimator 912 controls the adjustable step size parameter μ[k] that is being fed to the LMS module 920. In one embodiment, the error estimator 912 includes a high MSE indicator and a low MSE indicator. A high MSE (low SINR) indicates that w is not close to $w_{opt}$, and thus a need for a larger step size. A low MSE (high SINR) indicates that w is close to $w_{opt}$, and thus a desirability of a smaller step size. An exemplary method of MSE estimation (or, equivalently, SINR estimation) for the 8VSB signal is discussed below.

In some embodiments, the error estimator 912 periodically estimates an error, such as an MSE, every block of M symbols times from the trellis decoded symbols outputted by the decoder 928 as follows. For example, in the case of an MSE estimate, an instantaneous MSE estimate at block time k is given by EQN. (19).

$$\xi_{dec}^2[k] = \left(\frac{1}{M}\right)\sum_{i=0}^{M-1}(y[m+i]-d[m+i])^2 \quad (19)$$

where k is a block index, symbol index base m=(k−1)M, y is the equalizer output, d is the zero delay output of the trellis decoder 928, and M is a selected block size. Similarly, in the case of an MSE estimate, an averaged MSE estimate is given by EQN. (20).

$$\xi_{dec,\beta}^2[k]=(1-\beta_{dec})\xi_{dec}^2[k]+\beta_{dec}\xi_{dec,\beta}^2[k-1],$$
$$0<\beta_{dec}<1 \quad (20)$$

Note that values of $\beta_{dec}$ are typically close to 1, with a smaller value providing a noisier MSE estimate but faster tracking of a changing MSE.

Figure 10:
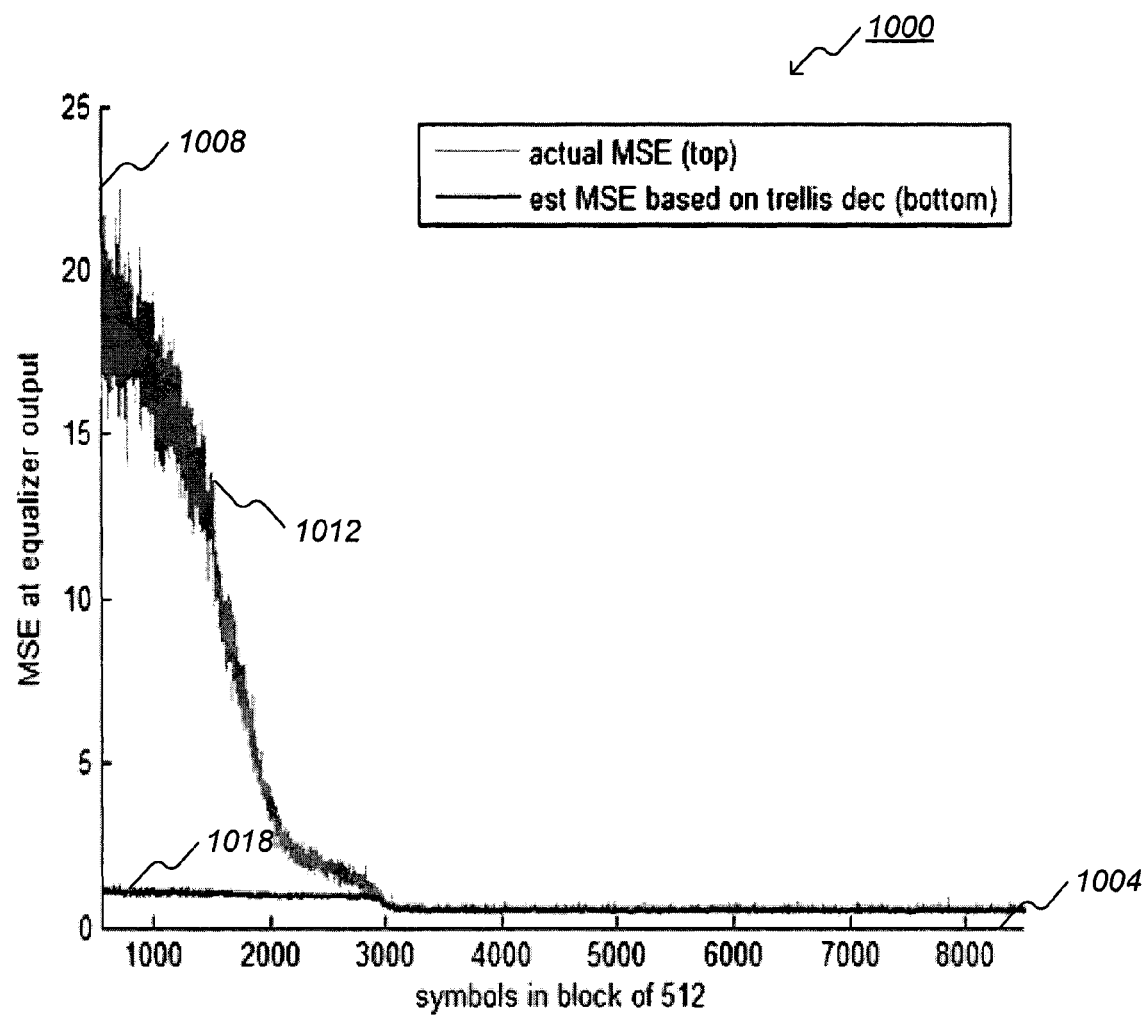
FIG. 10 shows an MSE estimate plot based on coded symbols.

FIG. 10 shows an estimate plot 1000. Times (in terms of symbol blocks at the output of the equalizer 900) are measured along an x-axis 1004, and values of the MSE are measured along a y-axis 1008. A curve 1012 shows actual MSEs obtained, and a curve 1018 shows values of the MSE estimate $\xi_{dec,\beta}^2$. FIG. 10 shows that when the actual MSEs (curve 1012) are above about 0.9 (equivalent to an SINR below 13.75 dB), the estimated MSE $\xi_{dec,\beta}^2$ is considerably below the actual MSE.

Alternatively, error values may be estimated using only the a priori known 2-level segment sync symbols. For example, in the case of an MSE estimate, whenever d[p] . . . d[p+3] are segment sync symbols, then an instantaneous MSE estimate at segment j is given by EQN. (21).

$$\xi_{seg}^2[j] = \left(\frac{1}{4}\right)\sum_{i=0}^{3}(y[p+i]-d[p+i])^2 \qquad (21)$$

where j is a segment index, and p=832(j−1) is a symbol index (note that blocks k and segments j are in general asynchronous). Similarly, in the case of an MSE estimate, whenever d[p] ... d[p+3] are segment sync symbols, then an averaged MSE estimate is given by EQN. (22).

$$\xi_{seg,\beta}^2[j]=(1-\beta_{seg})\xi_{seg}^2[j]+\beta_{seg}\xi_{seg,\beta}^2[j-1], 0<\beta_{seg}<1 \qquad (22)$$

Note that values of $\beta_{seg}$ are typically close to 1, with a smaller value providing a noisier MSE estimate but faster tracking of a changing MSE.

Figure 11:
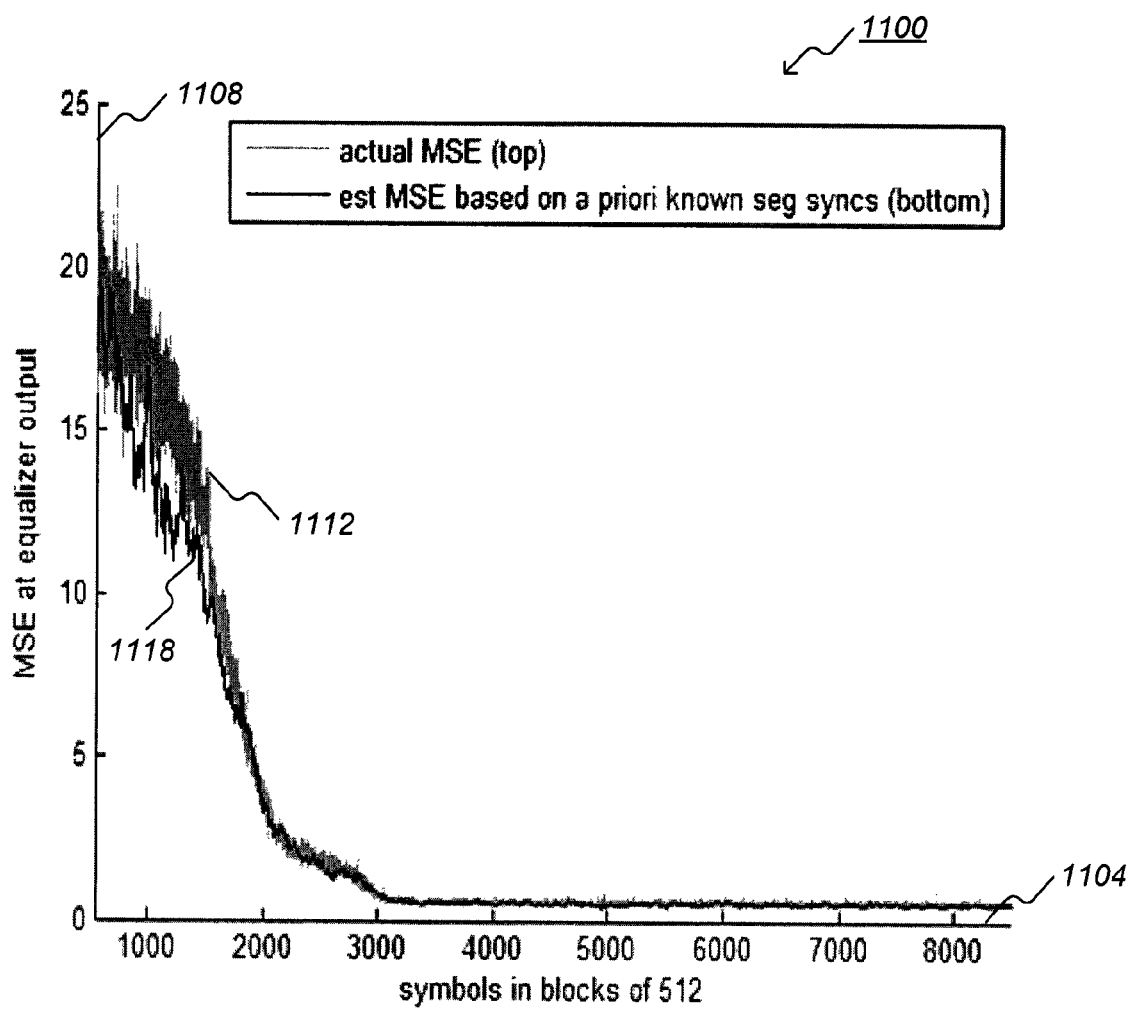
FIG. 11 shows an estimate plot based on uncoded symbols.

FIG. 11 shows an estimate plot 1100. Times (in terms of symbol blocks at the output of the equalizer 900) are measured along an x-axis 1104, and values of the MSE are measured along a y-axis 1108. A curve 1112 shows actual MSEs obtained, and a curve 1118 shows values of the MSE estimate $\xi_{seg,\beta}^2$. FIG. 11 shows that values of $\xi_{seg,\beta}^2$ are more accurate than $\xi_{dec,\beta}^2$ at high MSE (low SINR).

Figure 12:
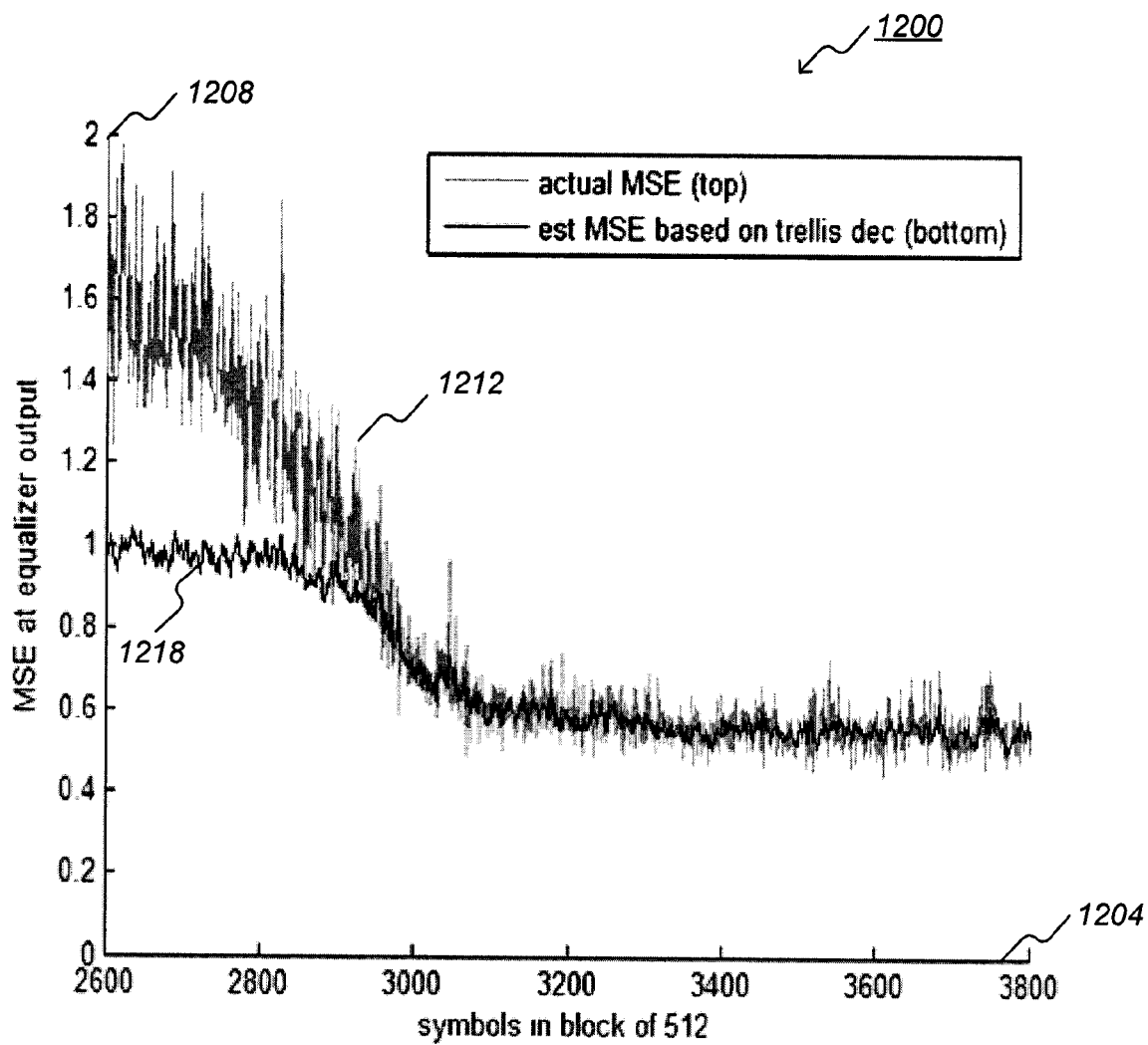
FIG. 12 shows an estimate plot showing a portion of the plot of FIG. 10.
Figure 13:
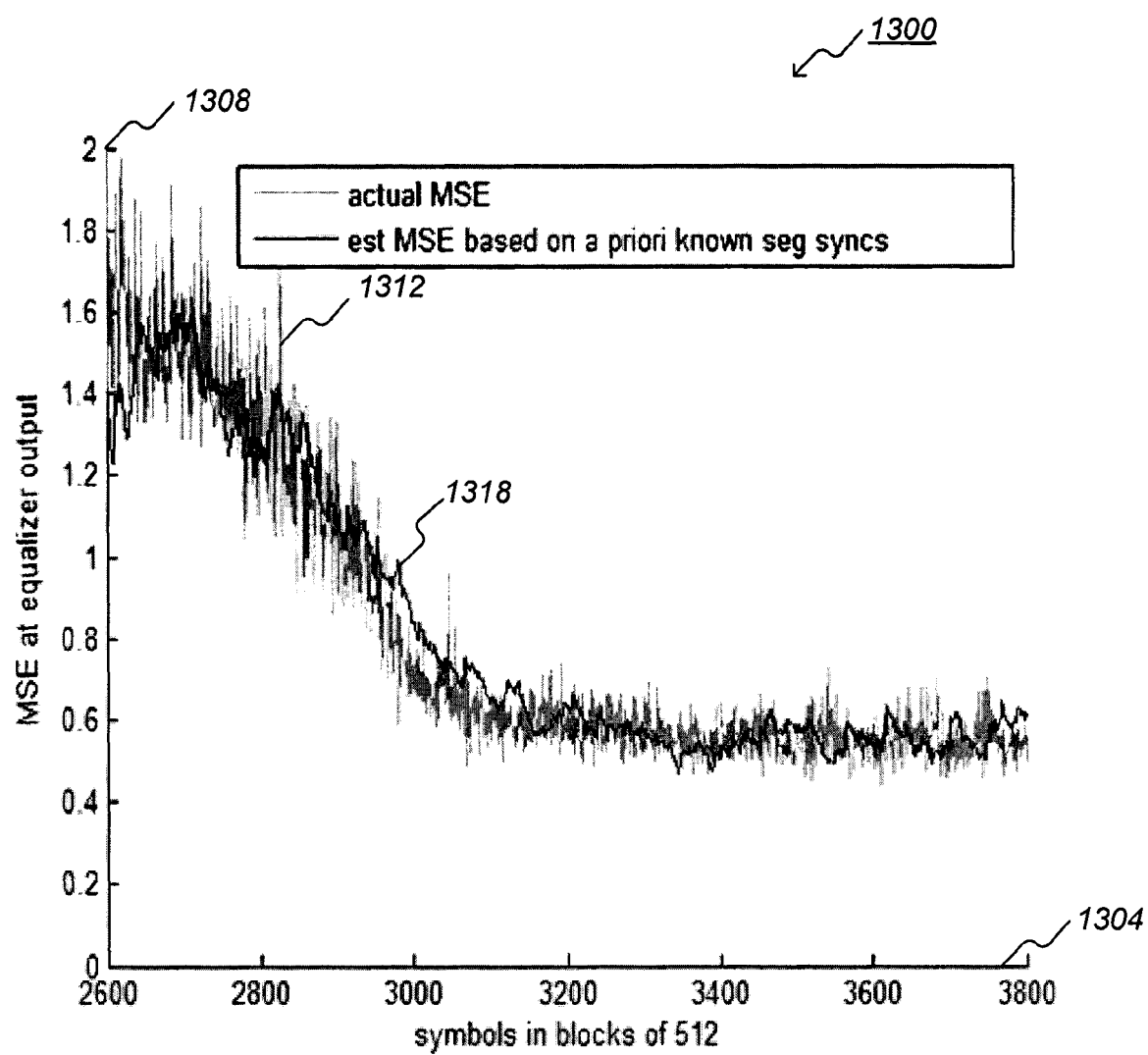
FIG. 13 shows an estimate plot showing a portion of the plot of FIG. 11.

FIG. 12 shows an estimate plot 1200 showing a portion of the plot 1000 of FIG. 10 between symbol blocks 2600 and 3800. Times (in terms of symbol blocks at the output of the equalizer 900) are measured along an x-axis 1204, and values of the MSE are measured along a y-axis 1208. A curve 1212 shows actual MSEs obtained, and a curve 1218 shows values of the MSE estimate $\xi_{dec,\beta}^2$. Similarly, FIG. 13 shows an estimate plot 1300 showing a portion of the plot 1100 of FIG. 11 between symbol blocks 2600 and 3800. Times (in terms of symbol blocks at the output of the equalizer 900) are measured along an x-axis 1304, and values of the MSE are measured along a y-axis 1308. A curve 1312 shows actual MSEs obtained, and a curve 1318 shows values of the MSE estimate $\xi_{dec,\beta}^2$.

As shown in FIG. 12 and FIG. 13, while the $\xi_{seg,\beta}^2$ estimate is better than $\xi_{dec,\beta}^2$ at high MSE, the $\xi_{seg,\beta}^2$ estimate is noisier than $\xi_{dec,\beta}^2$ as MSE decreases because $\xi_{seg}^2$ is averaged over fewer symbols than is $\xi_{dec}^2$ (4<<M). Thus, $\xi_{seg}^2$ represents a noisier estimate of the actual MSE. As such, each of the two methods provides relatively better estimates for respective MSE regions. Hence, according to various embodiments of the invention, these methods are selectively combined to provide a more accurate MSE estimate both at low and high MSE.

For example, in one embodiment involving EQN. (23) and EQN. (24), if $\xi_{dec,\beta}^2$ is less than a predetermined MSE value (e.g., associated with a convergence state), the step size generator 916 selects $\xi_{dec,\beta}^2$ as the error estimate EstMSE. If $\xi_{dec,\beta}^2$ is greater than or equal to the predetermined MSE value, the step size generator 916 selects $\xi_{seg,\beta}^2$ as the error estimate EstMSE. In some embodiments, the predetermined MSE value is about 0.9. That is, If $\xi_{dec,\beta}^2[k]<0.9$ (equivalent to SINR>13.75 dB)

$EstMSE[k]=\xi_{dec,\beta}^2[k]$ (near or post convergence) (23)

Else $EstMSE[k]=\xi_{seg,\beta}^2[j]$ (pre convergence) (24)

Figure 14:
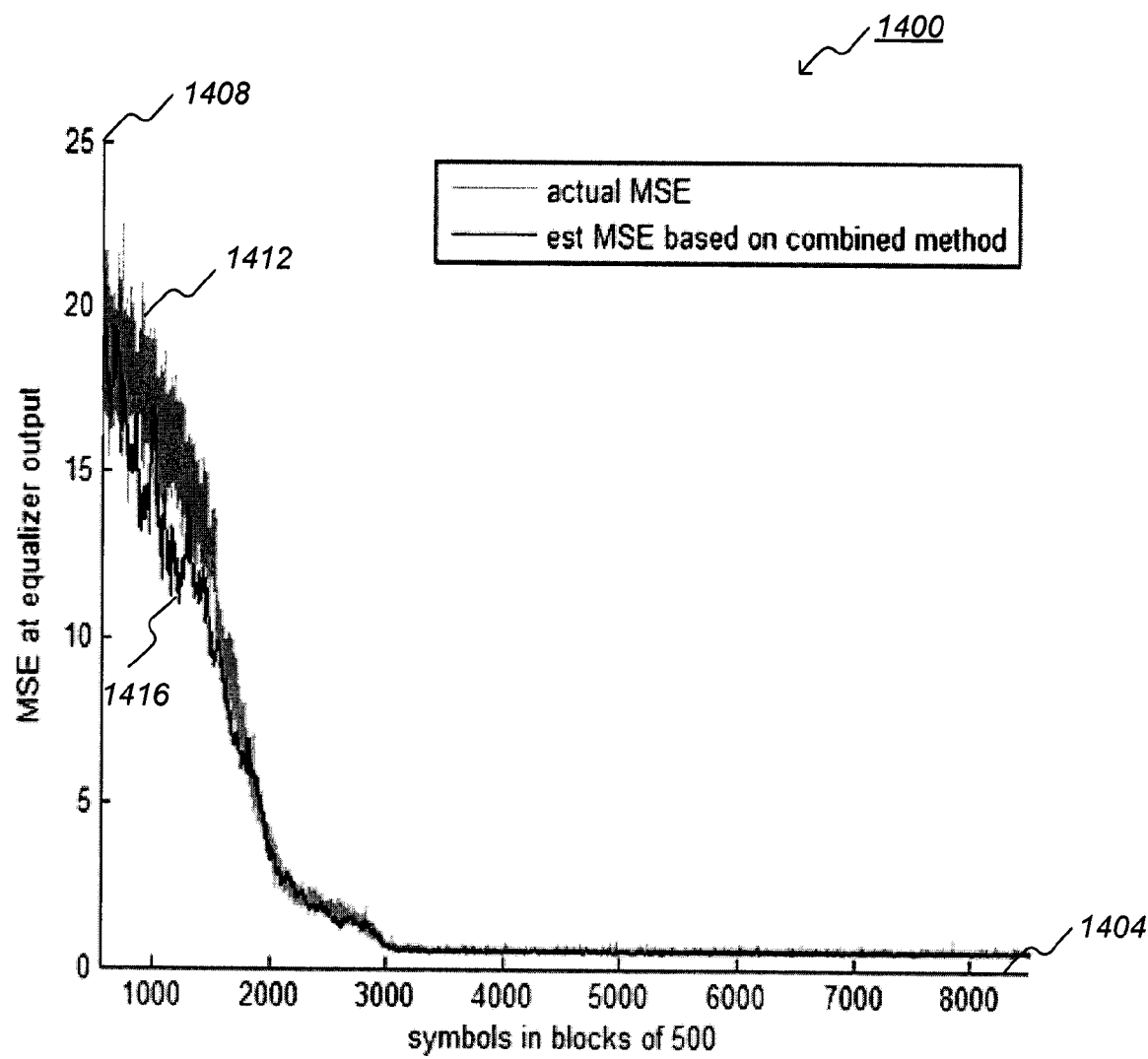
FIG. 14 shows an estimate plot based on selective use of coded and uncoded symbols.
Figure 15:
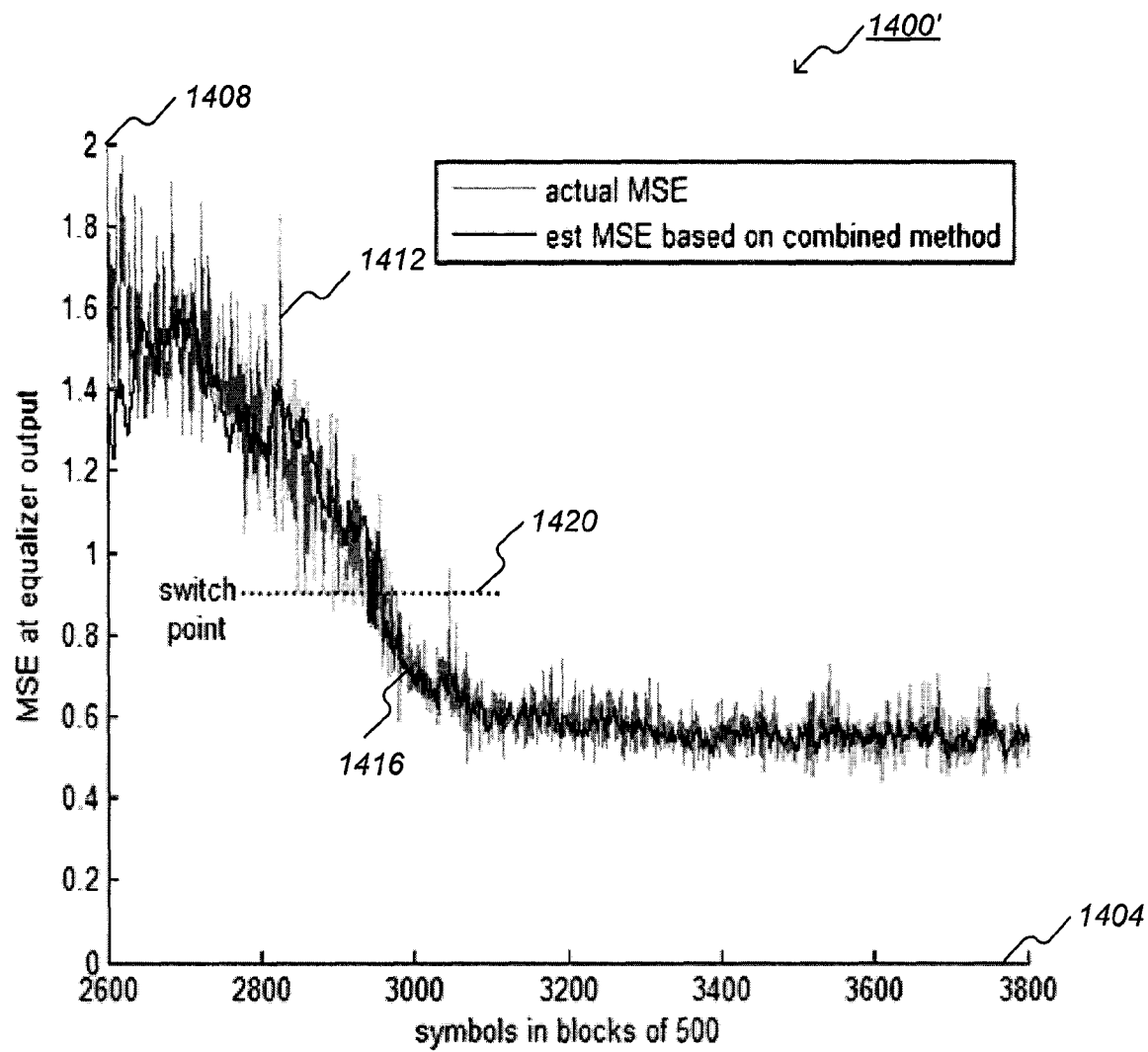
FIG. 15 shows an estimate plot showing a portion of the plot of FIG. 14.

FIG. 14 shows an error estimate plot 1400 based on selectively combining use of coded and uncoded symbols. Times (in terms of symbol blocks at the output of the equalizer 900) are measured along an x-axis 1404, and values of the MSE in dB are measured along a y-axis 1408. A curve 1412 shows actual MSEs obtained, and a curve 1416 shows values of the MSE estimate EstMSE determined by EQNS. (21)-(24) and associated logic. FIG. 15 similarly shows a portion 1400' of the estimate plot 1400 from symbol blocks 2600 to 3800. The portion 1400' shows the error estimator 912 transitioning from use of uncoded symbols (i.e., $\xi_{seg,\beta}^2$) to use of coded symbols (i.e., $\xi_{dec,\beta}^2$) at a switch point 1420. In the embodiment shown, the switch point is set at about MSE=0.9.

Once the error estimator 912 has determined an error estimate, the step size generator 916 uses the error estimate EstMSE[k] to select a variable LMS step size depending on a range within which the error estimate EstMSE[k] falls. For example, as shown in expression (25), if the error estimate EstMSE[k] falls within a range $\Re_r$, the step size generator 916 sets the step size parameter µ[k] equal to a predetermined step size $\mu_r$.

If EstMSE[k]∈$\Re_r$ $\mu[k]=\mu_r$ (25)

end

In one embodiment, smaller values of EstMSE correspond to lower values of $\mu_r$. For example, the step size generator 916 can use three EstMSE[k] ranges: a first range $\Re_1$, a second range $\Re_2$, and a third range $\Re_3$. If EstMSE[k] is within the first range $\Re_1$, which is less than or equal to 0.7 dB (equivalent to an estimated SINR of about 14.75 dB), the step size generator 916 uses a step size of $\mu_1$. Similarly, if EstMSE[k] is within the second range $\Re_2$, which is between 0.7 dB and 0.9 dB (equivalent to an estimated SINR of about 13.75 dB), the step size generator 916 uses a step size of $\mu_2$. If EstMSE[k] is within the third range $\Re_3$, which is above 0.9 dB, the step size generator 916 uses a step size of $\mu_3$. In such cases, $\mu_1$ is the smallest among the three step sizes, and $\mu_3$ is the largest among the three step sizes.

In other embodiments, the step size generator 916 determines the step size differently. For instance, the step size generator 916 may employ a function (e.g., a continuous function) that computes the step size based on information received from the error estimator 912. In some embodiments, the step size is given by EQN. (25').

$\mu[k]=\gamma EstMSE[k]$ (25')

where γ is a predetermined positive real constant.

Figure 16:
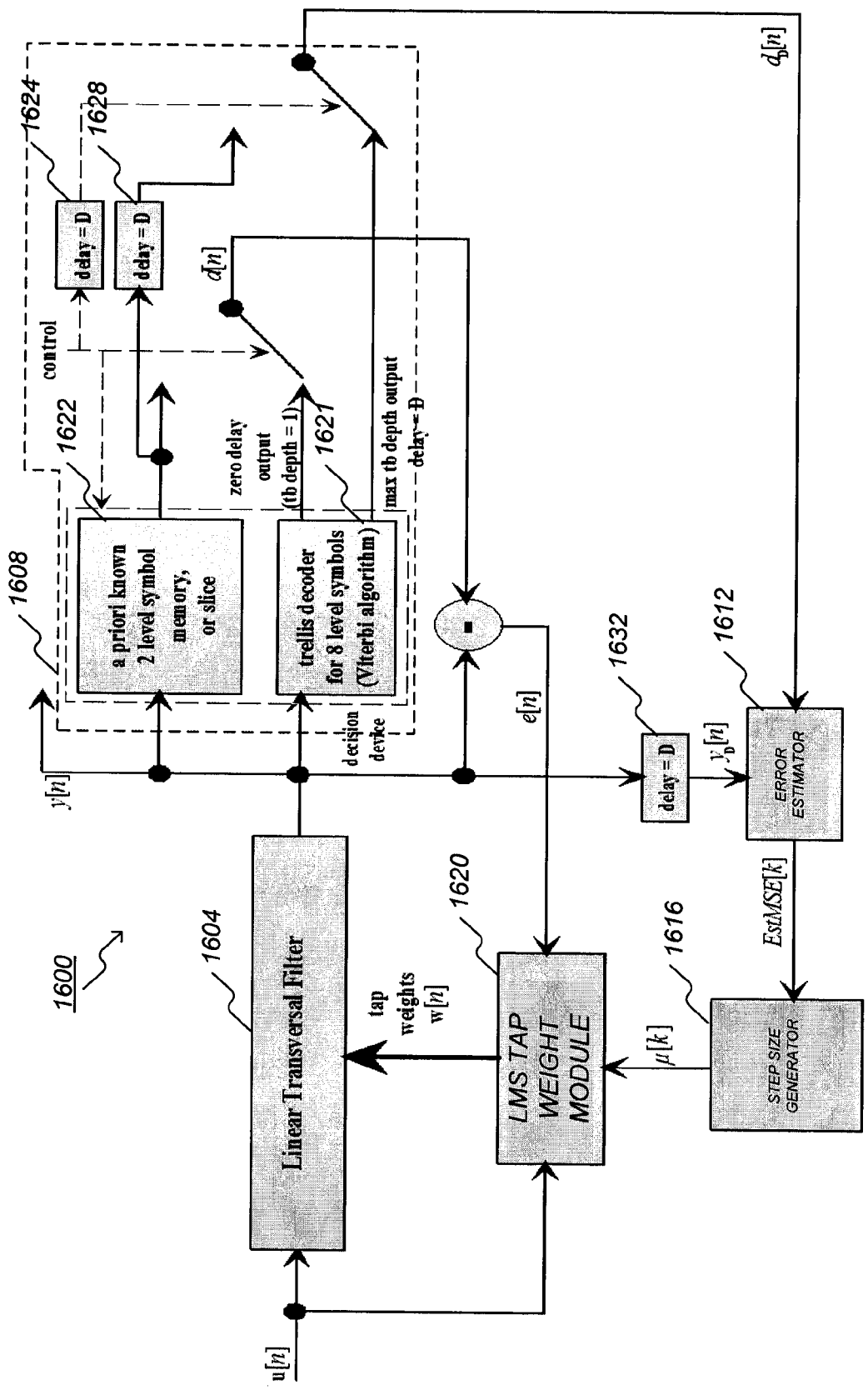
FIG. 16 shows a linear equalizer system according to an embodiment of the invention.

FIG. 16 shows a second LE system 1600 according to an embodiment of the invention. The LE system 1600 is an alternative embodiment of the LE system 900 of FIG. 9C. Similar to the LE system 900, the LE system 1600 includes a linear transversal filter 1604 having tap weights w and an output y[n], a selection module 1608, an error estimator 1612, a step size generator 1616 that generates a step size parameter µ[k], and an LMS tap weight module 1620 that adjusts the tap weights w based on the step size parameter µ[k]. Furthermore, the selection module 1608 includes a decoder 1621 that decodes the coded symbols at the equalizer output y[n] using the Viterbi algorithm, and a slicer 1622 that slices the unknown 2-level symbols at a midpoint.

The LE system 1600 also includes a plurality of delay blocks 1624, 1628, 1632 that introduce delays during signal processing. In some embodiments, the error estimator 1612 includes an MSE estimator. In such cases, the step size generator 1616 generates the step size parameter µ[k] based on errors estimated by the MSE estimator. However, unlike the LE system 900 of FIG. 9C, the LE system 1600 uses a trellis decoder 1621 with a full traceback depth D+1 (which thus has a decode delay D) and delay blocks 1624, 1628, 1632, all with delay D. A full traceback depth of the trellis decoder 1621 can generate an output that has a higher reliability than a zero delay output generated by the trellis decoder 928 of FIG. 9C. As such, the trellis decoder 1621 with adjustable traceback depth controlled by the delay blocks 1624, 1628, 1632 can provide a more accurate $\xi_{dec,\beta}^2$ value if both the a priori known 2-level symbol output memory and the y[n] signal are likewise delayed by D. Accordingly, the input to the error estimator 1612 is $d_D[n]$, which is $d_D[n]$ delayed by an amount D.

In the LE system 1600, for the coded symbols, an instantaneous MSE estimate at block time k given by EQN. (26).

$$\xi_{dec}^2[k] = \left(\frac{1}{M}\right)\sum_{i=0}^{M-1} (y_D[m+i] - d_D[m+i])^2 \quad (26)$$

where k is a block index, the symbol index base m=(k−1)M, $y_D$ is a delayed equalizer output, d is a full traceback output of the trellis decoder 1621 with a delay D, and M is a selected block size. Similarly, in the LE system 1600, for the uncoded symbols, an instantaneous MSE estimate at segment j is given by EQN. (27).

$$\xi_{seg}^2[j] = \left(\frac{1}{4}\right)\sum_{i=0}^{3} (y_D[p+i] - d_D[p+i])^2 \quad (27)$$

where j is a segment index, and p=832(j−1) is a symbol index. Blocks k and segments j are in general asynchronous.

It should be noted that the numerical values described above and illustrated in the drawings are exemplary values only. Other numerical values can also be used.

Various convergence criteria may be used in connection with embodiments of the invention. In some embodiments, an initial error (e.g., MSE) estimate based on coded symbols is used to determine if coded symbols should continue to be used for further error estimates, or if uncoded symbols should be used for further error estimates. Other exemplary embodiments use convergence criteria based on how often the sign of an error gradient changes.

Various features and advantages of the invention are set forth in the following claims.

What is claimed is:

1. A method of determining a step size of an adaptive equalizer for a digital data receiver, data received by the receiver including coded symbols and uncoded symbols, the method comprising:
   determining a first error estimate based on decoded symbols corresponding to the coded symbols;
   determining a second error estimate based on the uncoded symbols;
   comparing the first error estimate to an error estimate threshold value;
   continuously adaptively selecting one of the determined first error estimate and the determined second error estimate based on the comparison to the error estimate threshold value,
   wherein, when the first error estimate is less than the error estimate threshold value, the first error estimate is selected, and when the first error estimate is greater than the error estimate threshold value, the second error estimate is selected, and
   wherein, when no uncoded symbols are available to determine the second error estimate, a previously calculated value for the second error estimate is used for the adaptive selection of one of the determined first error estimate and the determined second error estimate; and
   determining a step size based on the selected error estimate.

2. The method of claim 1, wherein the coded symbols are trellis-coded 8-level symbols.

3. The method of claim 1, further comprising decoding the coded symbols to produce the decoded symbols.

4. The method of claim 3, wherein the coded symbols are decoded with a zero delay.

5. The method of claim 1, wherein the first error estimate is a mean-squared-error estimate.

6. The method of claim 5, wherein the first error estimate is an averaged mean-squared-error estimate determined based on a plurality of instantaneous mean-squared-error estimates.

7. The method of claim 1, wherein the uncoded symbols comprise 2-level segment sync symbols, the method further comprising slicing the 2-level symbols.

8. The method of claim 7, wherein the second error estimate is determined based on the sliced 2-level symbols.

9. The method of claim 1, wherein determining a step size based on the selected error estimate comprises:
   comparing the selected error estimate with a plurality of error ranges including a first error range, each of the error ranges having a corresponding step size; and
   selecting the corresponding step size of the first error range if the selected error estimate is within the first error range.

10. The method of claim 1, wherein the error estimate threshold value comprises one of a predetermined mean-squared-error and a predetermined signal to noise plus interference ratio, and wherein the second error estimate is selected when the first error estimate is equal to the error estimate theshold value.

11. The method of claim 1, wherein the equalizer is a linear-mean-squared (LMS) equalizer for 8-level-vestigial-sideband (8VSB) modulated signals.

12. The method of claim 1, wherein the method is iteratively performed.

13. The method of claim 1, wherein the digital data receiver is a digital television receiver.

14. A method of determining a step size of an adaptive equalizer for a digital data receiver, data received by the receiver including coded symbols and uncoded symbols, the method comprising:
   based on a convergence criterion, selecting one of a first signal estimation process and a second signal estimation process, the first signal estimation process utilizing decoded symbols corresponding to the coded symbols, and the second signal estimation process utilizing the uncoded symbols;
   determining a signal estimate based on the selected signal estimation process;
   determining an error estimate based on the received data and the signal estimate; and
   determining a step size based on the error estimate by comparing the error estimate with a plurality of error ranges including a first error range, each of the error ranges having a corresponding step size, and selecting the corresponding step size of the first error range if the error estimate is within the first error range.

15. The method of claim 14, wherein the convergence criterion is indicative of a signal to noise plus interference ratio.

16. The method of claim 14, wherein the decoded symbols are trellis decoded symbols, and the uncoded symbols are segment sync symbols.

17. The method of claim 14, wherein the error estimate is a mean-squared-error estimate.

18. The method of claim 14, wherein the digital data receiver is a digital television receiver.

19. An adaptive equalizer for a digital data receiver, data received by the receiver including coded symbols and uncoded symbols, the equalizer comprising:
 a selection module configured to continually select, based on a convergence criterion, one of decoded symbols and the uncoded symbols, the decoded symbols corresponding to the coded symbols;
 an error estimator configured to compare the received data and the selected symbols, and to generate an error estimate based on the comparison; and
 a step size generator configured to generate a step size based on the error estimate, wherein the step size generator comprises a comparator configured to compare the error estimate with a plurality of error ranges including a first error range, each of the error ranges having a corresponding step size, and to select the corresponding step size of the first error range if the error estimate is within the first error range.

20. The equalizer of claim 19, wherein the equalizer is implemented on a semiconductor chip.

21. The equalizer of claim 19, wherein the coded symbols are trellis-coded symbols, further comprising a trellis decoder configured to decode the coded symbols to produce the decoded symbols.

22. The equalizer of claim 19, wherein the error estimate comprises a mean-squared-error estimate.

23. The equalizer of claim 19, wherein the uncoded symbols comprise segment sync symbols, the equalizer further comprising a slicer configured to slice the segment sync symbols to produce sliced uncoded symbols.

24. The equalizer of claim 23, wherein the selection module is configured to select, based on the convergence criterion, one of the decoded symbols and the sliced uncoded symbols.

25. The equalizer of claim 19, wherein the convergence criterion comprises one of a predetermined mean-squared-error and a predetermined signal to noise plus interference ratio.

26. The equalizer of claim 19, wherein the equalizer is implemented in a digital television receiver.

27. A device configured to process digital television signals, the device comprising:
 a receiver including a demodulator, a decoder, a slicer, and an equalizer,
 the receiver configured to receive radio frequency signals modulated with data including coded symbols and uncoded symbols,
 the demodulator configured to demodulate the received radio frequency signals to produce the coded symbols and the uncoded symbols,
 the decoder configured to decode the coded symbols to produce corresponding decoded symbols,
 the slicer configured to slice the uncoded symbols to produce corresponding sliced symbols, and
 the equalizer including
  a selection module configured to select, based on a convergence criterion, one of the decoded symbols and the sliced symbols,
  an error estimator configured to compare the data and the selected symbols, and to generate an error estimate based on the comparison, and
  a step size generator configured to generate a step size based on the error estimate.

28. The device of claim 27, wherein the device is a tuner, a television, a PC adapter card, a set top box, a DVD recorder, a HDTV recorder, a phone, or a handheld device.

29. A method of determining a step size for a linear-mean-squared (LMS) equalizer of 8-level-vestigial-sideband (8VSB) modulated signals having trellis-coded symbols and segment sync symbols, the method comprising:
 (a) decoding the trellis-coded symbols;
 (b) determining a first mean-squared-error estimate based on the decoded trellis-coded symbols;
 (c) slicing the segment sync symbols;
 (d) determining a second mean-squared-error estimate based on the sliced segment sync symbols;
 (e) comparing the first mean-squared-error estimate to an error estimate threshold value;
 (f) continually adaptively selecting one of the first mean-squared-error estimate and the second mean-squared-error estimate based on the comparison to the error estimate threshold value,
  wherein, when the first mean-squared-error estimate is less than the error estimate threshold value, the first mean-squared-error estimate is selected, and when the first mean-squared-error estimate is greater than or equal to the error estimate threshold value, the second mean-squared-error estimate is selected, and
  wherein, when no uncoded symbols are available to determine the second mean-squared-error estimate, a previously calculated value for the second mean-squared-error estimate is used for the adaptive selection of one of the determined first mean-squared-error estimate and the determined second mean-squared-error estimate;
 (g) determining a step size based on the selected error estimate; and
 (h) iteratively performing acts (a)-(g).

30. A digital communication receiver configured to receive radio frequency signals modulated with data including coded symbols and a priori known uncoded symbols, the receiver comprising:
 a demodulator configured to demodulate the received radio frequency signals to produce the coded symbols and the a priori known uncoded symbols;
 a decoder configured to decode the coded symbols to produce corresponding decoded symbols; and
 an equalizer including
  a selection module configured to select, based on a convergence criterion, one of the decoded symbols and the a priori known uncoded symbols,
  an error estimator configured to compare the data and the selected symbols, and to generate an error estimate based on the comparison, and
  a step size generator configured to generate a step size based on the error estimate.

* * * * *

UNITED STATES PATENT AND TRADEMARK OFFICE
CERTIFICATE OF CORRECTION

PATENT NO. : 8,385,397 B2
APPLICATION NO. : 11/687909
DATED : February 26, 2013
INVENTOR(S) : Fimoff et al.

Page 1 of 1

It is certified that error appears in the above-identified patent and that said Letters Patent is hereby corrected as shown below:

In the Claims:

At Claim 14, Column 14, Line 44, replace "criterion, selecting" with
--criterion, continually selecting--

At Claim 27, Column 15, Line 57, replace "configured to select" with
--configured to continuously select--

At Claim 30, Column 16, Line 51, replace "configured to select" with --configured to continually select--

Signed and Sealed this
Fourteenth Day of May, 2013

Teresa Stanek Rea
*Acting Director of the United States Patent and Trademark Office*